United States Patent
Keefer

(10) Patent No.: US 9,984,415 B2
(45) Date of Patent: May 29, 2018

(54) METHOD AND APPARATUS FOR PRICING INSURANCE POLICIES

(75) Inventor: Alan Harrison Keefer, San Mateo, CA (US)

(73) Assignee: Guidewire Software, Inc., Foster City, CA (US)

( * ) Notice: Subject to any disclaimer, the term of this patent is extended or adjusted under 35 U.S.C. 154(b) by 850 days.

(21) Appl. No.: 12/683,129

(22) Filed: Jan. 6, 2010

(65) Prior Publication Data

US 2011/0071859 A1  Mar. 24, 2011

Related U.S. Application Data

(63) Continuation of application No. 12/566,452, filed on Sep. 24, 2009.

(51) Int. Cl.
*G06Q 40/08* (2012.01)

(52) U.S. Cl.
CPC .................... *G06Q 40/08* (2013.01)

(58) Field of Classification Search
CPC ........ G06Q 50/18; G06Q 10/06; G06Q 50/24; G06Q 40/08; G06F 17/243; G06F 17/30286; H04L 41/5003
(Continued)

(56) References Cited

U.S. PATENT DOCUMENTS

| 4,567,359 A | 1/1986 | Lockwood |
| 4,642,768 A | 2/1987 | Roberts |

(Continued)

FOREIGN PATENT DOCUMENTS

| EP | 0278132 | 8/1988 |
| EP | 0297780 | 1/1989 |

(Continued)

OTHER PUBLICATIONS

37 CFR 1.121 Manner of making amendments in applications by Bit Law \; web.archive.org/web20090517000813/http://www.bitlaw.com/source/37cfr/1_121.html; Nov. 2008.*

(Continued)

*Primary Examiner* — Sarah M Monfeldt
*Assistant Examiner* — Mary M Gregg
(74) *Attorney, Agent, or Firm* — Van Pelt, Yi & James LLP

(57) ABSTRACT

An insurance policy management computing system (201) stores a legally-binding insurance policy as a read-only document including the complete policy history. To facilitate revisions to the policy, the computing system (201) provides an opportunity (202) to revise an insurance policy and recalls (203) the currently legally-binding insurance policy. Since the legally-binding insurance policy is a read-only document, the computing system (201) uses the legally-binding policy to generate an editable version that is a complete copy of the legally-binding policy. Once the editable version of the insurance policy has been generated, the input revisions can be incorporated into the policy and then, the revised version of the insurance policy is saved as a read-only, now-current version of the insurance policy. The new legally-binding insurance policy has a new creation and effective dates of the various policy elements. To evaluate the insurance policy, the most recently bound legally-binding insurance policy is accessed and that document contains the currently effective policy, as well as the policy history.

20 Claims, 38 Drawing Sheets

(58) Field of Classification Search
 USPC .......................................................... 705/4
 See application file for complete search history.

(56) References Cited

U.S. PATENT DOCUMENTS

| | | | |
|---|---|---|---|
| 4,718,009 A | | 1/1988 | Cuervo |
| 4,750,121 A | | 6/1988 | Halley et al. |
| 4,766,539 A | | 8/1988 | Fox |
| 4,831,526 A | | 5/1989 | Luchs et al. |
| 4,837,693 A | | 6/1989 | Schotz |
| 4,839,804 A | | 6/1989 | Roberts et al. |
| 4,876,648 A | | 10/1989 | Lloyd |
| 4,969,094 A | | 11/1990 | Halley et al. |
| 5,025,138 A | | 6/1991 | Cuervo |
| 5,136,502 A | | 8/1992 | Van Remortel et al. |
| 5,191,522 A | | 3/1993 | Bosco et al. |
| 5,235,507 A | | 8/1993 | Sackler et al. |
| 5,241,466 A | | 8/1993 | Perry et al. |
| 5,325,291 A | | 6/1994 | Garrett et al. |
| 5,446,653 A | | 8/1995 | Miller et al. |
| 5,537,315 A | | 7/1996 | Mitcham |
| 5,557,515 A | | 9/1996 | Abbruzzese et al. |
| 5,586,313 A | * | 12/1996 | Schnittker et al. |
| 5,590,037 A | | 12/1996 | Ryan et al. |
| 5,655,085 A | | 8/1997 | Ryan et al. |
| 5,673,402 A | | 9/1997 | Ryan et al. |
| 5,689,649 A | | 11/1997 | Altman et al. |
| 5,704,045 A | | 12/1997 | King et al. |
| 5,737,726 A | | 4/1998 | Cameron et al. |
| 5,752,236 A | | 5/1998 | Sexton et al. |
| 5,761,645 A | | 6/1998 | Hawkins |
| 5,806,042 A | | 9/1998 | Kelly et al. |
| 5,809,478 A | | 9/1998 | Greco et al. |
| 5,819,230 A | | 10/1998 | Christie et al. |
| 5,839,118 A | | 11/1998 | Ryan et al. |
| 5,845,256 A | | 12/1998 | Pescitelli et al. |
| 5,855,005 A | | 12/1998 | Schuler et al. |
| 5,873,066 A | | 2/1999 | Underwood et al. |
| 5,884,274 A | | 3/1999 | Walker et al. |
| 5,893,072 A | | 4/1999 | Zizzamia |
| 5,897,619 A | | 4/1999 | Hargrove, Jr. et al. |
| 5,903,873 A | | 5/1999 | Peterson et al. |
| 5,907,828 A | | 5/1999 | Meyer et al. |
| 5,913,198 A | | 6/1999 | Banks |
| 5,926,792 A | | 7/1999 | Koppes et al. |
| 5,926,800 A | | 7/1999 | Baronowski et al. |
| 5,930,759 A | | 7/1999 | Moore et al. |
| 5,950,169 A | | 9/1999 | Borghesi et al. |
| 5,956,691 A | | 9/1999 | Powers |
| 5,966,693 A | | 10/1999 | Burgess |
| 5,970,464 A | | 10/1999 | Apte et al. |
| 5,974,390 A | | 10/1999 | Ross |
| 5,991,733 A | | 11/1999 | Aleia et al. |
| 5,991,744 A | | 11/1999 | DiCresce |
| 5,999,917 A | | 12/1999 | Facciani et al. |
| 6,014,632 A | | 1/2000 | Gamble et al. |
| 6,014,645 A | | 1/2000 | Cunningham |
| 6,026,364 A | | 2/2000 | Whitworth |
| 6,041,304 A | | 3/2000 | Meyer et al. |
| 6,044,352 A | | 3/2000 | Deavers |
| 6,049,772 A | | 4/2000 | Payne et al. |
| 6,073,242 A | | 6/2000 | Hardy et al. |
| 6,098,070 A | | 8/2000 | Maxwell |
| 6,105,000 A | | 8/2000 | Hickman et al. |
| 6,119,093 A | | 9/2000 | Walker et al. |
| 6,128,598 A | | 10/2000 | Walker et al. |
| 6,145,056 A | | 11/2000 | Heydon et al. |
| 6,161,096 A | | 12/2000 | Bell |
| 6,163,770 A | | 12/2000 | Gamble et al. |
| 6,182,048 B1 | | 1/2001 | Osborn et al. |
| 6,205,434 B1 | | 3/2001 | Ryan et al. |
| 6,263,320 B1 | | 7/2001 | Danilunas et al. |
| 6,263,364 B1 | | 7/2001 | Najork et al. |
| 6,269,369 B1 | | 7/2001 | Robertson |
| 6,301,614 B1 | | 10/2001 | Najork et al. |
| 6,304,859 B1 | | 10/2001 | Ryan et al. |
| 6,321,265 B1 | | 11/2001 | Najork et al. |
| 6,330,541 B1 | | 12/2001 | Meyer et al. |
| 6,332,125 B1 | | 12/2001 | Callen et al. |
| 6,336,096 B1 | | 1/2002 | Jernberg |
| 6,338,040 B1 | | 1/2002 | Buman et al. |
| 6,343,272 B1 | | 1/2002 | Payne et al. |
| 6,347,302 B1 | | 2/2002 | Joao |
| 6,351,755 B1 | | 2/2002 | Najork et al. |
| 6,377,984 B1 | | 4/2002 | Najork et al. |
| 6,393,405 B1 | | 5/2002 | Vicente |
| 6,418,415 B1 | | 7/2002 | Walker et al. |
| 6,430,542 B1 | | 8/2002 | Moran |
| 6,473,737 B2 | | 10/2002 | Burke |
| 6,484,144 B2 | | 11/2002 | Martin et al. |
| 6,584,446 B1 | | 6/2003 | Buchanan et al. |
| 6,594,694 B1 | | 7/2003 | Najork et al. |
| 6,604,080 B1 | | 8/2003 | Kern |
| 6,606,740 B1 | | 8/2003 | Lynn et al. |
| 6,609,111 B1 | | 8/2003 | Bell |
| 6,625,582 B2 | | 9/2003 | Richman et al. |
| 6,684,189 B1 | | 1/2004 | Ryan et al. |
| 6,684,190 B1 | | 1/2004 | Powers et al. |
| 6,687,362 B1 | | 2/2004 | Lindquist et al. |
| 6,714,914 B1 | | 3/2004 | Peters et al. |
| 6,725,201 B2 | | 4/2004 | Joao |
| 6,760,709 B2 | | 7/2004 | Graff |
| 6,850,890 B1 | | 2/2005 | Roff |
| 6,869,362 B2 | | 3/2005 | Walker et al. |
| 6,870,913 B2 | | 3/2005 | Narasimhan et al. |
| 6,883,000 B1 | | 4/2005 | Gropper |
| 6,937,990 B1 | | 8/2005 | Walker et al. |
| 6,952,730 B1 | | 10/2005 | Najork et al. |
| 7,013,284 B2 | | 3/2006 | Guyan et al. |
| 7,027,463 B2 | | 4/2006 | Mathew et al. |
| 7,072,841 B1 | | 7/2006 | Pednault |
| 7,080,104 B2 | | 7/2006 | Ring et al. |
| 7,113,913 B1 | | 9/2006 | Davis et al. |
| 7,152,224 B1 | | 12/2006 | Kaler et al. |
| 7,167,855 B1 | | 1/2007 | Koenig |
| 7,187,932 B1 | | 3/2007 | Barchi |
| 7,236,952 B1 | | 6/2007 | D'Zmura |
| 7,249,037 B2 | | 7/2007 | Koppes et al. |
| 7,265,858 B2 | | 9/2007 | Park et al. |
| 7,277,861 B1 | | 10/2007 | Benson et al. |
| 7,343,310 B1 | * | 3/2008 | Stender .................. G06Q 10/10 705/2 |
| 7,788,296 B2 | | 8/2010 | Dalbora et al. |
| 2001/0011223 A1 | | 8/2001 | Burke |
| 2002/0004725 A1 | | 1/2002 | Martin |
| 2002/0013751 A1 | | 1/2002 | Facciani et al. |
| 2002/0016857 A1 | | 2/2002 | Harari |
| 2002/0026334 A1 | | 2/2002 | Igoe |
| 2002/0032586 A1 | | 3/2002 | Joao |
| 2002/0035488 A1 | | 3/2002 | Aquila et al. |
| 2002/0049610 A1 | | 4/2002 | Gropper |
| 2002/0049828 A1 | | 4/2002 | Pekarek-Kostka |
| 2002/0052764 A1 | | 5/2002 | Banks |
| 2002/0057915 A1 | | 5/2002 | Mann |
| 2002/0077869 A1 | | 6/2002 | Doyle et al. |
| 2002/0091553 A1 | | 7/2002 | Callen et al. |
| 2002/0138418 A1 | | 9/2002 | Zarin |
| 2002/0161681 A1 | | 10/2002 | Richman et al. |
| 2002/0170966 A1 | | 11/2002 | Hannigan et al. |
| 2003/0018498 A1 | | 1/2003 | Banks |
| 2003/0055767 A1 | | 3/2003 | Tamura et al. |
| 2003/0065540 A1 | | 4/2003 | Callen et al. |
| 2003/0069874 A1 | | 4/2003 | Hertzog et al. |
| 2003/0115126 A1 | | 6/2003 | Pitroda |
| 2003/0154109 A1 | | 8/2003 | Martin et al. |
| 2003/0158860 A1 | | 8/2003 | Caughey |
| 2003/0182310 A1 | | 9/2003 | Charnock et al. |
| 2003/0208490 A1 | | 11/2003 | Larrea et al. |
| 2003/0220966 A1 | | 11/2003 | Hepper et al. |
| 2003/0233326 A1 | | 12/2003 | Manley |
| 2004/0004725 A1 | | 1/2004 | Gorinevsky et al. |
| 2004/0059786 A1 | | 3/2004 | Caughey |
| 2004/0064404 A1 | | 4/2004 | Cohen et al. |
| 2004/0093222 A1 | | 5/2004 | Sipe et al. |

(56) References Cited

U.S. PATENT DOCUMENTS

| | | |
|---|---|---|
| 2004/0119760 A1 | 6/2004 | Grossman et al. |
| 2004/0133561 A1 | 7/2004 | Burke |
| 2004/0148201 A1 | 7/2004 | Smith et al. |
| 2004/0148567 A1 | 7/2004 | Jeon et al. |
| 2004/0162833 A1 | 8/2004 | Jones et al. |
| 2004/0172304 A1 | 9/2004 | Joao |
| 2004/0186896 A1 | 9/2004 | Daniell et al. |
| 2004/0193456 A1 | 9/2004 | Kellington |
| 2004/0215493 A1 | 10/2004 | Koppes et al. |
| 2004/0225535 A1 | 11/2004 | Bond et al. |
| 2004/0229671 A1 | 11/2004 | Stronach et al. |
| 2004/0236792 A1 | 11/2004 | Celik |
| 2004/0267595 A1 | 12/2004 | Woodings et al. |
| 2005/0060638 A1 | 3/2005 | Mathew et al. |
| 2005/0075947 A1 | 4/2005 | Bell et al. |
| 2005/0120084 A1 | 6/2005 | Hu et al. |
| 2005/0138013 A1 | 6/2005 | Walker et al. |
| 2005/0149376 A1 | 7/2005 | Guyan et al. |
| 2005/0193063 A1 | 9/2005 | Cannata et al. |
| 2005/0250552 A1 | 11/2005 | Eagle et al. |
| 2006/0031088 A1 | 2/2006 | Risen et al. |
| 2006/0036527 A1 | 2/2006 | Tinnirello et al. |
| 2006/0052091 A1 | 3/2006 | Onyon et al. |
| 2006/0136274 A1 | 6/2006 | Olivier et al. |
| 2006/0155750 A1 | 7/2006 | Fowler et al. |
| 2006/0190546 A1 | 8/2006 | Daniell |
| 2006/0195422 A1 | 8/2006 | Cadiz et al. |
| 2006/0212452 A1 | 9/2006 | Cornacchia, III |
| 2006/0218017 A1 | 9/2006 | Ren et al. |
| 2006/0242210 A1 | 10/2006 | Ring et al. |
| 2006/0265255 A1 | 11/2006 | Williams |
| 2006/0293984 A1 | 12/2006 | Loch |
| 2007/0005463 A1 | 1/2007 | Davis et al. |
| 2007/0061384 A1 | 3/2007 | Harrington et al. |
| 2007/0070940 A1 | 3/2007 | Vander Veen et al. |
| 2007/0106698 A1 | 5/2007 | Elliott et al. |
| 2007/0118533 A1 | 5/2007 | Ramer et al. |
| 2007/0150542 A1 | 6/2007 | Sommerer |
| 2007/0156463 A1 | 7/2007 | Burton |
| 2007/0156465 A1 | 7/2007 | Walker et al. |
| 2007/0162454 A1 | 7/2007 | D'Albora et al. |
| 2007/0185743 A1* | 8/2007 | Jinks ................................ 705/4 |
| 2007/0255601 A1* | 11/2007 | Heydon et al. .................... 705/4 |
| 2007/0265889 A1 | 11/2007 | Koppes et al. |
| 2007/0276705 A1 | 11/2007 | Walker et al. |
| 2008/0027762 A1* | 1/2008 | Herzfeld et al. .................. 705/4 |
| 2008/0027844 A1 | 1/2008 | Little |
| 2008/0275717 A1 | 11/2008 | Willard et al. |
| 2008/0306771 A1 | 12/2008 | Zhou et al. |
| 2009/0192904 A1 | 7/2009 | Patterson |
| 2009/0210258 A1 | 8/2009 | Cardot et al. |
| 2010/0070311 A1 | 3/2010 | Heydon et al. |
| 2010/0106640 A1 | 4/2010 | Meury |
| 2010/0228800 A1* | 9/2010 | Aston ............... G06F 17/30153 707/822 |
| 2010/0274718 A1 | 10/2010 | Ghosh |
| 2011/0071858 A1 | 3/2011 | Keefer |

FOREIGN PATENT DOCUMENTS

| | | |
|---|---|---|
| EP | 0332770 | 9/1989 |
| EP | 0472786 | 3/1992 |
| EP | 0895173 | 2/1999 |
| EP | 1338966 | 8/2003 |
| WO | 8401448 | 4/1984 |
| WO | 9300643 | 1/1993 |
| WO | 9308546 | 4/1993 |
| WO | 9322735 | 11/1993 |
| WO | 9410637 | 5/1994 |
| WO | 9503569 | 2/1995 |
| WO | 9619774 | 6/1996 |
| WO | 9621903 | 7/1996 |
| WO | 9624103 | 8/1996 |
| WO | 9741524 | 11/1997 |
| WO | 9812616 | 3/1998 |
| WO | 9838563 | 9/1998 |
| WO | 9821680 | 1/1999 |
| WO | 9901810 | 1/1999 |
| WO | 9921116 | 4/1999 |
| WO | 9922330 | 5/1999 |
| WO | 9923589 | 5/1999 |
| WO | 9924891 | 5/1999 |
| WO | 9927482 | 6/1999 |
| WO | 9944111 | 9/1999 |
| WO | 9960537 | 11/1999 |
| WO | 0013101 | 3/2000 |
| WO | 0017800 | 3/2000 |
| WO | 0023927 | 4/2000 |
| WO | 0052616 | 9/2000 |
| WO | 0052866 | 9/2000 |
| WO | 0057310 | 9/2000 |
| WO | 0063812 | 10/2000 |
| WO | 0063813 | 10/2000 |
| WO | 0063815 | 10/2000 |
| WO | WO-2004049114 A2 | 6/2004 |

OTHER PUBLICATIONS

Records Retention and Disposition Guidelines; by the Collaborative Electronic Records Project Rockefeller Archive Center Revised Nov. 2008; 14 pages.*
U.S. Appl. No. 11/412,670, filed Apr. 27, 2006, Heydon et al.
U.S. Appl. No. 12/623,572, filed Nov. 23, 2009, Heydon et al.
Amendment A for U.S. Appl. No. 11/086,889, filed Feb. 12, 2010.
Christopher B. Eide, "Guidewire's pending U.S. Appl. No. 11/321,671", Letter from Morrison Foerster, Apr. 2, 2010.
European Search Report from a counterpart European patent application No. 06 02 7066 dated Mar. 22, 2007.
Goodcontacts Research LTD., "GoodContacts Synchronizer Solution", 2003.
Guidwire Softwareguidewire Software, "Guidewire ClaimCenter Components", Jan. 2004.
Non-Final Office Action for U.S. Appl. No. 11/086,889, dated Nov. 12, 2009.
Resubmitted Amendment A for U.S. Appl. No. 11/086,889, dated Mar. 18, 2010.

* cited by examiner

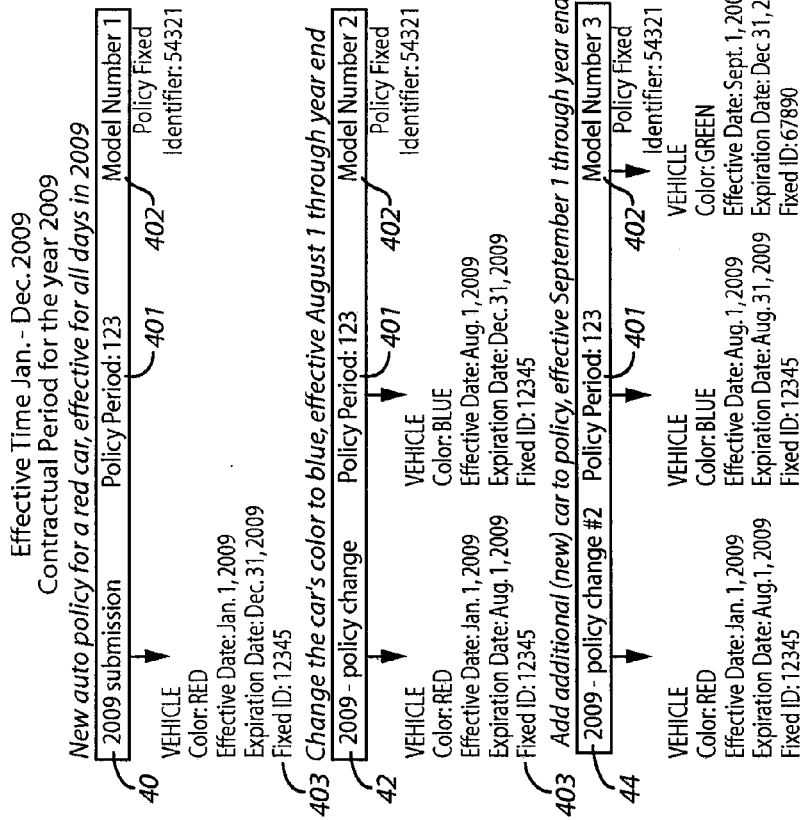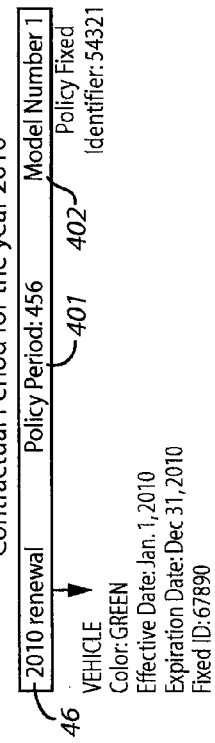
FIG. 4

| Desktop | ▶ | Account | ▶ | Policy | ▶ | Search | ▶ | Administration | ▶ | | Go to (Alt+/) |

Policy File | Personal Auto Joe Smith1 | Account # 5483261334 | Policy # 40684 | Scheduled (Exp. 07/31/2009) — 501

Actions ▲ | Summary

Policy Contract ▼
Policy Info
Drivers
Vehicles
PA Coverage
Quote
Forms
Payment Date: 01/31/2009

Tools
Summary
Audit
Billing
Contacts
Participants
Notes
Documents
Work Orders
Risk Analysis
History

Account Information
Account Number    5483261334
Account Name      Joe Smith
Address
Address Line 1    123 Main St.
City              San Francisco
State/Province    California
Zip Code          94131
Country           United States of America
Address Type      Home

Policy
Product           Personal Auto
Number            40684
Issued            Yes
Period Issued     01/15/2009
Primary Named Insured
Name              Joe Smith
Address           123 Main St., San Francisco, CA 94131

Associated Work Order
Created           01/15/2009
Period Issued     01/15/2009
Closed            01/15/2009
Type              Submission
Period
Effective Date         01/31/2009
Expiration Date        07/31/2009
Policy Period Premium  $735.00

Producer of Record
Producer Code     Cid Vicious agency
                  301-008597 Cid Vicious agency
Producer of Service
Organization      Cid vicious agency
Producer Code     301-008597 Cid Vicious agency

Current Activities

Policy Transactions
Compare
☐ Period Eff Date  Trans Eff Date ▼  Trans Close Date  Type        Work Order #  Transaction Cost  Comment
☐ 01/31/2009       01/31/2009        01/15/2009        Submission  166048        $735.00

Work Orders In Progress
Compare

Recent Notes

504 → Policy Contract
503 → Date: 01/31/2009
502 → Summary

| Desktop ▸ | Account ▸ | Policy ▸ | Search ▸ | Administration ▸ | | Go to (Alt+/) |

☆ Submission (Bound) | ⊡ Personal Auto | Eff: 01/31/2009 | Joe Smith | Account # 5483261334 | Policy # 40684 | Underwriter: Elizabeth Nyugen | Approved

Actions ▸ | Policy Review

Submission 166048
Bound
Pre-Qualification
Policy Contract
 Policy Info
 Drivers
 Vehicles
 PA Coverages
Risk Analysis
● Policy Review
 Quotes
 Forms
 Payment ❀ Tools
Notes
Documents
Participants
Work Plan
History < Back | Next >

| Primary Named Insured | Joe Smith | | Product | Personal Auto |
| Address | 123 Main St., San Francisco, CA 94131 | | Effective Date | 01/31/2009 |
| Date Quote Needed | 01/22/2009 | | Expiration Date | 07/31/2009 |

Personal Auto

Policy Level Coverages
| Coverage/Coverage Term Description | Value |
| Liability - Bodily Injury and Property Damage Coverage | |
| Auto Liability Package | 250/500/100 ——607 |
| Medical Payments Coverage | |
| Medical Limit | 5,000 |
| Uninsured Motorist - Bodily Injury Coverage | |
| Uninsured Motorist - BI Limits | 25/50 |
| Uninsured Motorist - Property Damage Coverage | |
| Uninsured Motorist - Property Damage Limit | 3,500 |

Vehicle Coverages
Garage 1: 123 Main St., San Francisco, CA 94131
Vehicle 1
VIN 12333   Model Year 2000   Make Honda   Model Civic
Primary Driver Joe Smith
Vehicle Rate Modifiers
Anti-Lock Brakes Discount Passive Restraint System Anti Theft Discount
No
Vehicle Coverages

| Coverage/Coverage Term Description | Value |
| Comprehensive Coverage | |
| Comprehensive Deductible | 500 ——608 |
| Collision Coverage | |
| Collision Deductible | 500 ——609 |

< Back | Next >

| Desktop | ▶ | Account | ▶ | Policy | ▶ | Search | ▶ | Administration | ▶ | | Go to (Alt+/) |
|---|---|---|---|---|---|---|---|---|---|---|---|

◀ Policy Change (Draft) | 🏢 Personal Auto I Eff. 03/31/2009 | Joe Smith | Account # 5483261334 | Policy # 40684 | Underwriter: Elizabeth Nyugen |

| Actions ▲ | Start Policy Change |
|---|---|

Policy Change 598616
Draft

| [<Back] [Quote] [Withdraw] [Save Draft] |
|---|

Policy Contract
  Policy Info
  Drivers
  Vehicles
  PA Coverages
Policy Review
  Quotes
  Forms
  Payment

[Differences]

Changes effective 03/31/2009

Added ———— 708
  Item
  2007 Acura RSX in California

Changed ———— 709

| | Item | New Value | Old Value |
|---|---|---|---|
| | Liability - Bodily Injury and Property Damage Coverage: Auto Liability Package | 1M CSL | 250/500/100 |
| ⓘ | Comprehensive Coverage: Comprehensive Deductible | 1,000 | 500 |
| ⓘ | Collision Coverage: Collision Deductible | 1,000 | 500 |

| [<Back] [Quote] [Withdraw] [Save Draft] |
|---|

❄ Tools
  Notes
  Documents
  Participants
  Work Plan
  Risk Analysis
  History <u>700</u>
*FIG. 7B*

| Desktop | ▼ | Account | ▼ | Policy | ▼ | Search | ▼ | Administration | ▼ | | Go to (Alt+/) |

Policy File | 🖥 Personal Auto| Joe Smith| Account # 5483261334 | Policy # 40684 | In Force (Exp.07/31/2009)

Actions ▲ | PA Coverages

▷ Policy Contract ▼
Policy Info
Drivers
Vehicles
PA Coverage
Quote
Forms
Payment
Date: 04/15/2009 ▫

❋ Tools ▷
Summary
Audit
Billing
Contacts
Participants
Notes
Documents
Work Orders
Risk Analysis
History

| Coverages | Additional Coverages |

Coverages applied to all vehicles in California

Liability - Bodily Injury and Property Damage
Auto Liability Package         1M CSL ——1007

Medical Payments
Medical Limit         5,000

Uninsured Motorist - Bodily Injury
Uninsured Motorist - BI Limits         25/50

Uninsured Motorist - Property Damage
Uninsured Motorist - Property Damage Limit         3,500

Coverages applied per vehicle in California

| ☐ Vehicle # ▲ | Description | Comprehensive | Collision | Towing Labor | Rental |
|---|---|---|---|---|---|
| ☐ 🅰 1 | 2000 Honda Civic | 1,000 | 1,000 | Not Selected | Not Selected |
| ☐ 🅱 2 | 2000 Acura RSX | 500 | 500 | Not Selected | Not Selected |

Coverage Details

Comprehensive
Comprehensive Deductible         1,000 ——1008

Collision
Collision Deductible         1,000 ——1009

| Desktop | ▼ | Account | ▼ | Policy | ▼ | Search | ▼ | Administration | ▼ | | Go to (Alt+/) |

Policy File | Personal Auto|Joe Smith| Account # 5483261334 | Policy # 40684 | In Force (Exp. 07/31/2009)

Actions ▶ | Vehicles

Policy Contract ▼ | Vehicle Details

Policy Info
Drivers
Vehicles
PA Coverage
Quote
Forms
Payment
Date: 01/31/2009

| | *Vehicle # ▲ | Vehicle Type | Model Year | Make | Model | Body Type | VIN |
|---|---|---|---|---|---|---|---|
| | 1 | Passenger/Light Truck | 2000 | Honda | Accord | | 12334 |

Vehicle Details | Additional Interest

Basic Vehicle Information
Vehicle #            1
Vehicle Type         Passenger/Light Truck
VIN                  12334
Model Year           2000
Make                 Honda
Model                Accord
Body Type
Color                White
License Plate
License State

Where Garaged
Location             1:123 Main St., San Francisco, CA
Cost New             $23,000.00
Stated Value
Leased or Rented     No
Length of
Lease/Rental (months)
Annual Miles
Commuting Miles
(one way)
Primary Use

Vehicle Rate Modifiers
Anti-Lock Brakes Discount    No
Passive Restraint System
Anti Theft Discount

Tools
Summary
Audit
Billing
Contacts
Participants
Notes
Documents
Work Orders
Risk Analysis
History

Assign Drivers to Vehicles
What percentage does each driver use this vehicle?

| Driver | Percentage |
|---|---|
| Joe Smith | 100 |
| Total | 100 |

*FIG. 11*

| Desktop | ▼ | Account | ▼ | Policy | ▼ | Search | ▼ | Administration | ▼ | | Go to (Alt+/) |

☆ Submission (Draft) | ● Workers' Compensation | Eff. 03/15/2009 Joe Smith | Account # 548 | Underwriter: Felicien Wagner |

Actions ▲ | WC Coverages

Submission 52337 | [<Back] [Next>] [Quote] [Save Draft] [Close Options ▼]
Draft Pre-Qualification | State Coverages | Policy Coverages
Policy Contract
  Policy Info | [Remove] | [Update All Basis]
  Locations | ☐ State | State IDs
○ WC Coverages | ☐ ⊞ California | 123345, 122-4567
  Supplemental
  WC Options | State Details
  Risk Analysis | Rating Periods | | Modifiers
  Policy Review | Anniversary Date [03/15/2009] ▣ | | ☐ Experience Mod (x.xx) Eligible
  Quote | ☐ Workers' Comp State-Specific Deductible | WC Schedule Credits   0
  Forms
  Payment | State IDs
| Joe Smith - Bureau ID [1233345]
※ Tools | Joe Smith - State Tax ID [122-4567]
Notes
Documents | Covered Employees ▶
Participants | [Add Class] [Remove]
Work Plan | ☐ Governing Law | *Location ▲ | *Class Code ↔ Description | # Employees | If Any | *Basis
History | ☐ State Act ▼ | 1: 123 Main St., San Fr ▼ | 0035 ⚲ FLORISTS - cultivating or gard | 45 | ☐ | 400000
| [<Back] [Next>] [Quote] [Save Draft] [Close Options ▼]

| Tools | | | |
|---|---|---|---|
| Notes | State | | State IDs |
| Documents | ▣ California | | 123345, 122-4567 |
| Participants | | | |
| Work Plan | State Details | | |
| History | Rating Periods | | |
| | Anniversary Date  03/15/2009 | | |
| | State IDs | | |
| | Joe Smith - Bureau ID  1233345 | | |
| | Joe Smith - State Tax ID  122-4567 | | |

Covered Employees

| Governing Law | Location ▲ | Description | | Modifiers |
|---|---|---|---|---|
| State Act | 1: 123 Main St., San Francisco, CA | Workers Compensation and Employee Liability Insurance Policy WC Payment Info Sheet | | WC Schedule Credits  0 |

| | *Class Code ▲ | Description | # Employees | If Any | Basis |
|---|---|---|---|---|---|
| | 0035 | FLORISTS - cultivating or gard | 45 | | 400000 |

Forms

| Form # ▲ | | | | Endorsement # ▲ | Replacing # |
|---|---|---|---|---|---|
| WC 00 00 00 | | | | | |
| WC Payment Info Sheet | | | | | |

[< Back]  [Next >]

| Desktop | ▼ | A̲ccount | ▼ | P̲olicy | ▼ | Search | ▼ | Administration | ▼ | | Go to (Alt+/) |

📁 Policy File | ● Workers' Compensation | Joe Smith | Account # 548 | Policy # 8439401423 | In Force (Exp. 03/15/2010)

| Actions ▷ | State Info |

▷ Policy Contract ▼ | State Coverages | Policy Coverages

Policy Info
  Locations      State
■ WC Coverages    📇 California
  WC Options
  Forms      State Details
  Quote
  Payment    Rating Periods
  Date: [03/30/2009] 📅    Anniversary Date    03/15/2009           State IDs
                                                                                123345, 122-4567

Modifiers
                         WC Schedule Credits      0

⚙ Tools    State IDs
  Summary    Joe Smith - Bureau ID      1233345
  Audit      Joe Smith - State Tax ID    122-4567
  Billing
  Contacts    Covered Employees
  Participants    Governing Law    *Location ◂    *Class Code ◂▴    Description    # Employees    If Any    *Basis
  Notes      State Act      1: 123 Main St., San    0035    FLORISTS - cultivating or gard    45           600000
  Documents              Francisco, CA
  Work Orders
  Risk Analysis
  History

*FIG. 14A*

| Desktop | ▼ | Account | ▼ | Policy | ▼ | Search | ▼ | Administration | ▼ | | Go to (Alt+/) |

Policy File | ● Workers' Compensation | Joe Smith | Account # 548 | Policy # 8439401423 | In Force (Exp. 03/15/2010)

| Actions | ▲ | State Info |
|---|---|---|

| State Coverages | Policy Coverages |

Policy Contract ▼
Policy Info
Locations
WC Coverages
WC Options
Forms
Quote
Payment
Date: 03/30/2009

Workers' Compensation States
Covered States: CA
Other States Insurance None
Covered States
Stop Gap
Stop Gap All monopoly states

Workers' Comp Employer's Liability
Employer's Liability Limit 100,000/10,000,000/100,000

Statutory Workers' Comp

❋ Tools
Summary
Audit
Billing
Contacts
Participants
Notes
Documents
Work Orders
Risk Analysis
History

| Desktop | ▶ | Account | ▶ | Policy | ▶ | Search | ▶ | Administration | ▶ | | Go to (Alt+/) |

◀ Policy Change (Quoted) | ● Workers' Compensation I Eff. 04/30/2009 I Joe Smith I Account # 548 | Policy # 8439401423 | Underwriter: Felicien Wagner |

Actions ▲

Policy Change 191910
Quoted

Policy Contract
  Policy Info
  Locations
  WC Coverages
  Supplemental
  WC Options
  Policy Review
○ Quote
  Forms
  Payment

Tools
  Notes
  Documents
  Participants
  Workplan
  Risk Analysis
  History

Quote

[◀Back] [Next▶] [Edit Policy Change] [Withdraw] [Print Quote]

| Policy Number | 8439401423 | | Transaction Effective Date | 04/30/2009 |
| Policy Period | 03/15/2009 - 03/15/2010 | | Transaction Description | change limits; change basis |
| Primary Named Insured | Joe Smith | | Total Premium | $62,986.00 |
| Address | 123 Main St., San Francisco, CA 94131 | | Taxes & Surcharges | $4,409.00 |
| Producer of Record Organization | Cid Viscious agency | | Total Cost | $67,395.00 |
| Producer Code | 301-008597 Cid Vicious agency | | Change in Cost | $22,091.00 |
| Producer of Service Organization | Cid Viscious agency | | | |
| Producer Code | 301-008597 Cid Vicious agency | | | |

[Policy Premium] [Cost Change Detail]

Standard Premium

| Loc. | Code | Description | Basis | Rate | Premium |
|---|---|---|---|---|---|
| 1 | 0035 | FLORISTS - cultivating or gardening | 400000 | 7.407 | ($29,628.00) |
| 1 | 0035 | FLORISTS - cultivating or gardening | 600000 | 7.407 | $44,442.00 |
| | 9902 | Emp liab increased limits | 29628 | 1.4500 | ($13,333.00) |
| | 9902 | Emp liab increased limits | 44442 | 1.4500 | $19,999.00 |
| | | Standard Premium | | | $21,480.00 |

Other Premium and Surcharges

| Loc. | Code | Description | Basis | Rate | Premium |
|---|---|---|---|---|---|
| | 9910 | Premium discount | 42961 | -0.0219 | $941.00 |
| | 9910 | Premium discount | 64441 | -0.0291 | ($1,875.00) |
| | 9912 | Terrorism premium | 400000 | 0.0500 | ($200.00) |
| | 9912 | Terrorism premium | 600000 | 0.0500 | $300.00 |
| | 9950 | Tax | 42340 | 0.0700 | ($2,964.00) |
| | 9950 | Tax | 62986 | 0.0700 | $4,409.00 |
| | | California Total Cost | | | $22091.00 |

Total Cost: $22,091.00  [◀Back] [Next▶] [Edit Policy Change] [Withdraw] [Bind] [Print Quote]

FIG. 17

| Desktop | ▼ | Account | ▼ | Policy | ▼ | Search | ▼ | Administration | ▼ | | Go to (Alt+/) |

Policy File | ● Workers' Compensation | | Wright Construction | Account # C000212105 | Policy # 444959 | In Force (Exp. 12/04/2009)

Actions ▶ | Summary

⇗Policy Contract▼

Policy Info
Locations
WC Coverages
WC Options
Forms
Quote
Payment
Date: 03/04/2009 ▣

▶ Tools

※ Summary

Audit Schedule
Billing
Contacts
Participants
Notes
Documents
Work Orders
Risk Analysis
History

1801

Account Information

| | | Associated Work Order | |
|---|---|---|---|
| Account Number | C000212105 | Created | 03/04/2009 |
| Account Name | Wright Construction & Landscape | Period Issued | 03/04/2009 |
| Address | | Closed | 03/04/2009 |
| Address Line 1 | 846 Yount Ln. | Type | Renewal |
| Address Line 2 | Floor 0000 | Period | |
| City | Hollywood | Effective Date | 12/04/2008 |
| State/Province | California | Expiration Date | 12/04/2009 |
| Zip Code | 91357 | Policy Period Premium | $25,762.00 |
| County | San Mateo | Producer of Record | |
| Country | United States of America | Organization | Armstrong and Company |
| Address Type | Home | Producer Code | 100-002541 Armstrong (Premier) |
| Address Description | Created by the Address Builder with code 0 | Producer of Service | |
| Official IDs | | Organization | Armstrong and Company |
| FEIN/SSN | 23-2345678 | Producer Code | 100-002541 Armstrong (Premier) |

Policy

Product | Workers' Compensation
Number | 444495
Issued | Yes
Period Issued | 03/04/2009

Primary Named Insured

Name | Wright Construction & Landscape
Address | 846 Yount Ln., Floor 0000, Developer Unit Habitation Cube
| #0000, Hollywood, CA 91357

Current Activities

| Due Date | Priority | Subject | Assigned To |
|---|---|---|---|
| 03/04/2009 | Normal | Review Submission | Alice Applegate |

Policy Transactions

| | Period Eff Date | Trans Eff Date ▼ | Trans Close Date | Type | Work Order # | Transaction Cost | Comment |
|---|---|---|---|---|---|---|---|
| ☐ | 12/04/2008 | 12/04/2008 | 12/01/2008 | Renewal | RNW0000325 | $25,762.00 | Renewal |
| ☐ | 12/04/2007 | 12/04/2007 | 12/22/2007 | Reinstatement | RST0000324 | $24,974.00 | Reinstatement |
| ☐ | 12/04/2007 | 12/04/2007 | 12/08/2007 | Cancellation | CAN0000012 | ($24,974.00) | Cancellation |
| ☐ | 12/04/2007 | 12/04/2007 | 12/01/2007 | Renewal | RNW0000324 | $24,974.00 | Renewal |
| ☐ | 12/04/2006 | 12/04/2006 | 03/04/2007 | Policy Change | PC0000012 | — | Policy Change |
| ☐ | 12/04/2006 | 12/04/2006 | 12/01/2006 | Submission | SUB00000001 | $24,911.00 | Submission |

Compare

Work Orders in Progress

Compare

| Desktop | ▼ | Account | ▼ | Policy | ▼ | Search | ▼ | Administration | ▼ | | Go to (Alt+/) |

◉ Final Audit (Draft) | ● Workers' Compensation | Wright Construction | Account # C000212105 | Policy # 444959 | Start 12/04/2007 | End 12/04/2008

Actions

Audit 1515070
Draft

| Summary
o Details
| Premiums

✱ Tools

Notes
Documents
Participants
Workplan
Risk Analysis

▷ Details

2130 ⟶ [<Back] [Waive] [Save Draft] [Calculate Premiums]

California
12/04/2007 - 12/04/2008

| * Location ▲ | * Class Code ▲▼ | Description | Estimated Payroll | Audited Payroll |
|---|---|---|---|---|
| 1 | 0005 | NURSERIES - propagation and cu | 100274 | 140000 |

2132 ⟶ Texas
12/04/2007 - 12/04/2008

| * Location ▲ | * Class Code ▲▼ | Description | Estimated Payroll | Audited Payroll |
|---|---|---|---|---|
| 2 | 0005 | FARM: Nursery Employees & | 100274 | 130000 |

2134 ⟶ New York
12/04/2007 - 12/04/2008

| * Location ▲ | * Class Code ▲▼ | Description | Estimated Payroll | Audited Payroll |
|---|---|---|---|---|
| 3 | 0005 | FARM: Nursery Employees & | 100274 | 130000 |

[<Back] [Waive] [Save Draft] [Calculate Premiums]

Final Audit Results

| | |
|---|---|
| Total Audited Premium | $30,815.00 |
| Taxes and Surcharges | $2,157.00 |
| Total Audited Cost | $32,972.00 |
| Total Estimated Cost | 24,974.00 |
| Difference | 7,998.00 |
| Additional Information | |
| Comments | |

2200

Premiums

[<Back] [Waive] [Submit] [Edit Audit] [Save Draft] [Override Rating]

[Summary] [Premium Details] ←2338

New York

Standard Premium

| Loc. | Code | Description | Estimated Basis | Estimated Rate | Estimated Payroll | Audited Payroll | Rate | Estimated Basis | Audited Basis | Estimated Premium | Audited Premium | Change |
|---|---|---|---|---|---|---|---|---|---|---|---|---|
| 3 | 0005 | Farm: Nursery Employees & Drivers | 8159 | -0.0151 | 100274 | 130000 | 5.6115 | | | $5,627.00 | $7,295.00 | $1,668.00 |
| | | Manual Premium | 100274 | 0.0500 | | | | | | $5,627.00 | $7,295.00 | $1,668.00 |
| | 9902 | Emp Liab increased limits | | | 5627 | 7295 | 1.4500 | | | $2,532.00 | $3,283.00 | $751.00 |
| | | Subject Premium | | | | | | | | $8,159.00 | $10,578.00 | $2,419.00 |
| | | Modified Premium | | | | | | | | $8,159.00 | $10,578.00 | $2,419.00 |
| | | Standard Premium | | | | | | | | $8,159.00 | $10,578.00 | $2,419.00 |

Other Premium and Surcharges

| Loc. | Code | Description | Estimated Amount | Audited Amount | Audited Rate | Audited Amount | Change |
|---|---|---|---|---|---|---|---|
| | 9910 | Premium Discount | 8,086.00 | ($123.00) | -0.0187 | ($198.00) | ($75.00) |
| | 9912 | Terrorism Premium | | $50.00 | 0.0500 | $65.00 | $15.00 |
| | | New York Total Premium | | | | $10,445.00 | $2,359.00 |
| | 9950 | Tax | 8086 | $566.00 | 0.0700 | $731.00 | $165.00 |
| | | New York Total Cost | | 8,652.00 | | $11,176.00 | $2,524.00 |

California

Standard Premium

| Loc. | Code | Description | Estimated Basis | Estimated Rate | Estimated Amount | Estimated Payroll | Audited Payroll | Rate | Audited Basis | Audited Rate | Estimated Premium | Audited Premium | Change |
|---|---|---|---|---|---|---|---|---|---|---|---|---|---|
| 1 | 0005 | NURSERIES - propagation and cultivation of nursery stock Manual Premium | | | | 100274 | 140000 | 4.8870 | | | $4,900.00 | $6,842.00 | $1,942.00 |
| | 9902 | Emp Liab increased limits | | | | 4900 | 6842 | 1.4500 | | | $4,900.00 | $6,842.00 | $1,942.00 |
| | | Subject Premium | | | | | | | | | $2,205.00 | $3,079.00 | $874.00 |
| | | Modified Premium | | | | | | | | | $7,105.00 | $9,921.00 | $2,816.00 |
| | | | | | | | | | | | $7,105.00 | $9,921.00 | $2,816.00 |
| | | Standard Premium | | | | | | | | | $7,105.00 | $9,921.00 | $2,816.00 |

Other Premium and Surcharges

| Loc. | Code | Description | Estimated Basis | Estimated Rate | Estimated Amount | Audited Basis | Audited Rate | Audited Amount | Change |
|---|---|---|---|---|---|---|---|---|---|
| | 9910 | Premium Discount | 7105 | -0.0151 | ($107.00) | 9921 | -0.0187 | ($186.00) | ($79.00) |
| | 9911 | Expense Constant | | | $120.00 | | | $120.00 | - |
| | 9912 | Terrorism Premium | 100274 | 0.0500 | $50.00 | 140000 | 0.0500 | $70.00 | $20.00 |
| | | California Total Premium | | | 7,168.00 | | | $9,925.00 | $2,757.00 |
| | 9950 | Tax | 7168 | 0.0700 | $502.00 | 9925 | 0.0700 | $695.00 | $193.00 |
| | | California Total Cost | | | 7,670.00 | | | $10,620.00 | $2,950.00 |

| Period Start | End Date | Type | Method | Process Start | Due Date | Status | Transaction Amount | Total Cost | Actions |
|---|---|---|---|---|---|---|---|---|---|
| 12/04/2006 | 12/04/2007 | Final Audit | Physical | 11/27/2007 | 01/15/2008 | Completed | $7,318.00 | $32,229.00 | Revise |
| 12/04/2007 | 12/04/2008 | Final Audit | Physical | 11/27/2008 | 01/15/2009 | Completed | $7,998.00 | $32,972.00 | Revise |
| 12/04/2008 | 12/04/2009 | Final Audit | Physical | 11/27/2009 | 01/15/2010 | Scheduled | | | Edit  Waive |

FIG. 25

METHOD AND APPARATUS FOR PRICING INSURANCE POLICIES

This application is a continuation of application Ser. No. 12/566,452 which was filed on Sep. 24, 2009 entitled METHOD AND APPARATUS FOR MANAGING REVISIONS AND TRACKING OF INSURANCE POLICY ELEMENTS, and is incorporated by reference as if fully rewritten herein.

TECHNICAL FIELD

This invention relates generally to insurance products and more particularly to revising and tracking of elements of insurance policies.

BACKGROUND

Insurance policies are known in the art and comprise complex agreements that specify items to be afforded coverage with respect to particular perils. An insurance policy almost invariably extends coverage for a predetermined period, during which claims can be made for covered losses. As a result, insurance policies rely heavily on accurate treatment of time periods, coverage amounts, and other policy details. The policy period is usually one year (though other periods are contemplated), and policies are generally renewed on an annual basis, with a new policy period starting at the end of the previous period. In some cases, changes to a policy coincide with the annual renewal, but in many cases changes occur mid-term. As a result, the effective date of a policy change may not coincide with the start or end of the policy period.

The effective date of a policy change is the date on which the change becomes legally effective and can comprise a present, retroactive, or future date. The change or model date of a policy change is the date on which the change was actually made, in real time. The change date will often be different from the effective date. Changes to a policy, whether at renewal or mid-period, may trigger a series of follow-on computations, one of which is often a recalculation of the total cost of the policy to reflect the changes and the amount of time remaining in the policy period. For purposes of calculating a premium, insurers need to know what coverages were, are, or will be in effect for what durations. In addition, for purposes of evaluating a claim, insurers need to be able to determine what coverages were in effect as of the date of the claim. Further, insurers need to known when the coverages were changed, when the change went into effect, and what changes were made when evaluating claims to help guard against potential fraud.

The ability to make changes with effective dates forward and backward in time can lead to many difficulties that have not been satisfactorily addressed by any existing implementations. A concern for many insurers is that the ability to make retroactive revisions to a policy may encourage people to retroactively seek coverage for a loss after the incident occurred. Further, the ability to make changes forward and backward in time may become complicated because a number of changes may be made with different effective dates and different change dates. Thus, it is not enough to record only the effective date of each change. At times the insurer will also want to analyze the policy based on the change or model date. An insurer needs to be able to ask not only what was effective as of the date of loss, but also what changes had been made as of that date. Such information may be particularly helpful when detecting fraud or in creating a trail for audit purposes. Therefore, there are two dimensions of time that should be represented with each change (the effective date and the model date of that change) and used correctly by the policy management application.

Existing systems do not adequately address the concerns presented by multiple policy revisions and revisions with different change and effective dates. Systems often have difficulty saving both the information concerning what policy elements were effective on a certain date and when those elements were changed. As a result, it is difficult to discern both the policy change date history and the policy effective date history, and to use that information to make automated coverage and pricing decisions. In many cases, all information about the actual change date (when the change occurred in real time) is lost or greatly obscured, preventing the ability to detect fraud and track audits, as discussed above. Instead, only the effective date of the change is preserved and the system can only determine the current legally binding terms for an effective date, without being able to reconstruct the legally binding terms for previous policy changes. Previous solutions to the problem of policy revisioning have stored the policy as a plurality of discrete temporally-sequential policy revisions that have an effective date and a change date stored therewith. Thus, when reviewing the policy as a whole at a particular date, each of the policy edits were processed for their impact on the policy to recreate a whole policy. Depending on the size and type of the insurance policy, constructing the policy from such discrete temporally-sequential policy revisions can be cumbersome and time consuming. In addition, such a system may make certain types of changes difficult to implement in an efficient manner. For example, for certain commercial insurance policies changes often happen across the term of the policy and such changes were difficult because creating such discrete temporally-sequential changes could become quite time consuming. As a result, current approaches to handling insurance policy revisions do not satisfactorily address the concerns presented by various policy changes, policy evaluation including determination of the legally binding policy, and the tracking of change dates and effective dates.

BRIEF DESCRIPTION OF THE DRAWINGS

The above needs are at least partially met through provision of the method and apparatus for managing revisions and tracking of insurance policy elements described in the following detailed description, particularly when studied in conjunction with the drawings, wherein:

FIG. 4 comprises an illustrative schematic as configured in accordance with various embodiments of the invention;

FIG. 5 comprises an illustrative screen shot as configured in accordance with various embodiments of the invention;

FIG. 6 comprises an illustrative screen shot as configured in accordance with various embodiments of the invention;

FIGS. 7A-7B comprise illustrative screen shots as configured in accordance with various embodiments of the invention;

FIG. 8 comprises an illustrative screen shot as configured in accordance with various embodiments of the invention;

FIGS. 9A-9B comprise illustrative screen shots as configured in accordance with various embodiments of the invention;

FIGS. 10A-10C comprise illustrative screen shots as configured in accordance with various embodiments of the invention;

FIG. 11 comprises an illustrative screen shot as configured in accordance with various embodiments of the invention;

FIGS. 12A-12C comprise illustrative screen shots as configured in accordance with various embodiments of the invention;

FIGS. 13A-13C comprises an illustrative screen shot as configured in accordance with various embodiments of the invention;

FIGS. 14A-14B comprise illustrative screen shots as configured in accordance with various embodiments of the invention;

FIGS. 15A-15B comprise illustrative screen shots as configured in accordance with various embodiments of the invention;

FIG. 16 comprises an illustrative screen shot as configured in accordance with various embodiments of the invention;

FIG. 17 comprises an illustrative screen shot as configured in accordance with various embodiments of the invention;

FIG. 18 comprises an illustrative screen shot as configured in accordance with various embodiments of the invention;

FIG. 19 comprises an illustrative screen shot as configured in accordance with various embodiments of the invention;

FIG. 20 comprises an illustrative screen shot as configured in accordance with various embodiments of the invention;

FIG. 21 comprises an illustrative screen shot as configured in accordance with various embodiments of the invention;

FIG. 22 comprises an illustrative screen shot as configured in accordance with various embodiments of the invention;

FIG. 23 comprises a partial view of an illustrative screen shot as configured in accordance with various embodiments of the invention;

FIG. 25 comprises an illustrative screen shot as configured in accordance with various embodiments of the invention.

Figure 1:
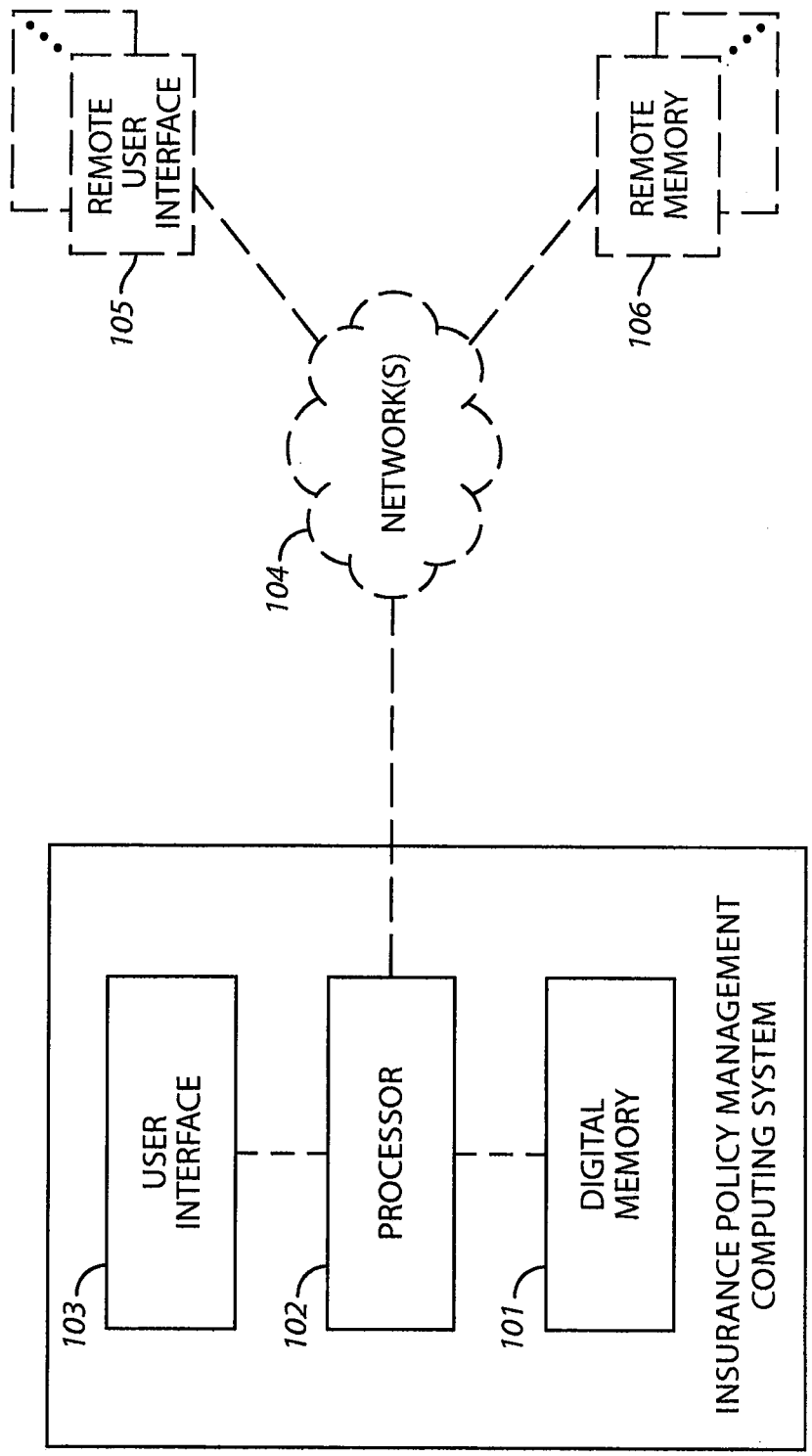
FIG. 1 comprises a schematic block diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, changing an insurance policy includes copying the entire legally-binding insurance policy, which was previously saved in read-only form, to make an editable copy, incorporating the policy changes into the editable copy of the insurance policy, and saving the changed version of the insurance policy as a read-only, now-current legally-binding version with a new creation date, thereby creating a new legally-binding insurance policy. As used herein, binding the insurance policy version creates the legal document to which the parties are legally bound and when a new insurance policy version is bound, it becomes the currently effective policy, superseding the previously binding insurance policy version.

The prior legally-binding insurance policy versions, which remain read-only, may be saved in the digital memory—though they are no longer effective—to keep a record of prior policies. Once an insurance policy has been bound, even for a short period of time, such as one second, subsequent or additional changes are accomplished by copying that entire legally-bound insurance policy into a new editable version. In addition, when determining whether a loss is covered, the most recently bound legally-binding policy is used since that policy represents the currently effective version of the policy. However, prior, no-longer-effective versions of the policy may be consulted when deciding whether to cover a loss, to ensure that, for example, coverage was not added retroactively (that is, with an earlier effective date) after the loss actually occurred.

A policy consists of elements such as covered items and coverages describing the limits, deductibles, and other conditions for covering those items against loss or damage. Policy elements have associated start and effective dates. Typically policy elements will have an effective date range that matches the effective date range of the policy period, meaning that the element is effective for the entire period covered by the policy. However, it is common for a new element to be added mid-period, in which case the start effective date for the element will be later than the start effective date of the policy period, or for an element to be removed before the end of the period, in which case its end effective date will be earlier than the end effective date of the policy period. Finally mid-term changes to an element will usually result in splitting the element into a first part with an end effective date at the effective date of the change, and a second modified part with a start effective date at the effective date of the change.

Storing multiple versions of the policy ordered by change date and storing effective-dated policy elements within a version provides the ability to efficiently use both change and effective date information. For example, determining whether a loss is covered can be made by first selecting a policy version based on the change date of interest, which is usually the currently effective policy version, and then examining the policy elements in that version to find the elements that match the date on which the loss occurred. Having the policy elements aggregated and saved as a complete policy provides users with additional functionality such as different access modes and quicker processing times. For example, an access mode, referred to as window mode, permits users to view and edit the policy and some or all of its elements over a period of time, such as a company's second quarter. Alternatively, another access mode, slice mode, permits the user to view and edit the policy as of a particular effective date. By one approach, revising certain types of insurance policies is more easily and quickly accomplished in window mode, which illustrates the policy over a period of time. In window mode editing, each edit does not require input effective date(s) as each period of time (such as a company's second quarter) has effective dates previously associated therewith. The window mode functionality that permits evaluation of a policy over time is efficiently generated, in part, because the entire policy is generated and saved in one version, as discussed above during the binding process. In sum, the policy is not generated from discretely saved revisions that have various change dates and effective dates associated therewith at the time of evaluation. By another approach, the user may use slice mode editing, which displays the policy as of a particular effective date, such that editing the policy is occurring as of a single point in time, the effective date, and several changes may be made at once (such as adding a new vehicle and several coverages) with all changes being assigned the same effective date.

So configured and arranged those skilled in the art will recognize that these teachings will provide for efficiently editing and evaluating insurance policies such that the policy history is easily accessible and policy coverages are easily ascertainable and adjustable both over time and as of a particular date. This in turn leads to an improved ability to service the insured individuals. Further, since the entire policy is available without needing to reconstruct the policy from discretely saved revisions, the policy can be easily viewed over a period of time. In addition, those skilled in the art will recognize and appreciate that these teachings are suitable for use with a number of existing automated processes in this regard and hence usable in a number of application settings employing from a very few to a very large number of business processes.

These and other benefits may become clearer upon making a thorough review and study of the following detailed description. Referring now to the drawings, and in particular to FIG. 1, an illustrative approach to a configurable platform that is compatible with many of these teachings for managing revisions of an insurance policy will now be presented. Those skilled in the art will recognize that such a configurable platform may be a partially or wholly programmable platform or, in some cases, may be a dedicated purpose platform. FIG. 1 generally depicts pertinent portions of an insurance policy management computing system for facilitating or controlling various processes related to the insurance policy business.

An apparatus 100, facilitating management and revisioning of insurance policies, includes a processor 102 that has a digital memory 101 and an end-user interface 103 operably coupled thereto. The user interface 103 as described herein includes a display as is typically used to convey and receive information. By one approach, the user interface 103 may comprise a browser-based interface, a user display, a user input such as a keyboard, and/or a cursor control interface of choice. It will be understood by those skilled in the art that a typical commercially viable offering will comprise a large number of interfaces 103.

Those skilled in the art will recognize and appreciate that such a processor 102 can comprise a fixed-purpose hard-wired platform or can comprise a partially or wholly programmable platform. All of these architectural options are well known and understood in the art and require no further description here. The processor 102 may also be operably coupled to a number of networks 104, which in turn may operably couple to remote user interfaces 105 and remote memories 106.

The digital memory 101 has stored therein a plurality of insurance policies. The digital memory 101 may also have a variety of programs for computer-based insurance processes such as billing, claim handling, and policy management, along with other information such as claim and account information, to note but a few. The digital memory 101 can comprise a single storage platform or it can comprise a distributed memory. Such architectural choices are well understood in the art and require no additional elaboration here.

As mentioned, there are a number of items stored in the digital memory 101 including insurance policies. The process for storing and revising these policies can vary. The digital memory 101 and processor 102 are configured and arranged to provide 202 an opportunity via the user interface 103 to revise a currently legally-binding insurance policy, as detailed below. As used herein, the term opportunity will be understood to refer to a presently rendered and immediately available mechanism by which the end user can effect the corresponding selection or action. A particular selection capability, for example, would not be considered an "opportunity" if the end user were required to select and click through a number of sub-menus in order to finally be able to select and act upon the particular capability. Further, an opportunity to revise, by one approach, may be rendered by providing a button, link, or drop down menu on a screen shot displayed on the end-user interface. Further, as used herein, all opportunities may be prompted opportunities. A prompted opportunity may include a variety of prompts such as asking the user to check boxes, select from a plurality of radio buttons, or input commands, to note but a few.

Figure 2:
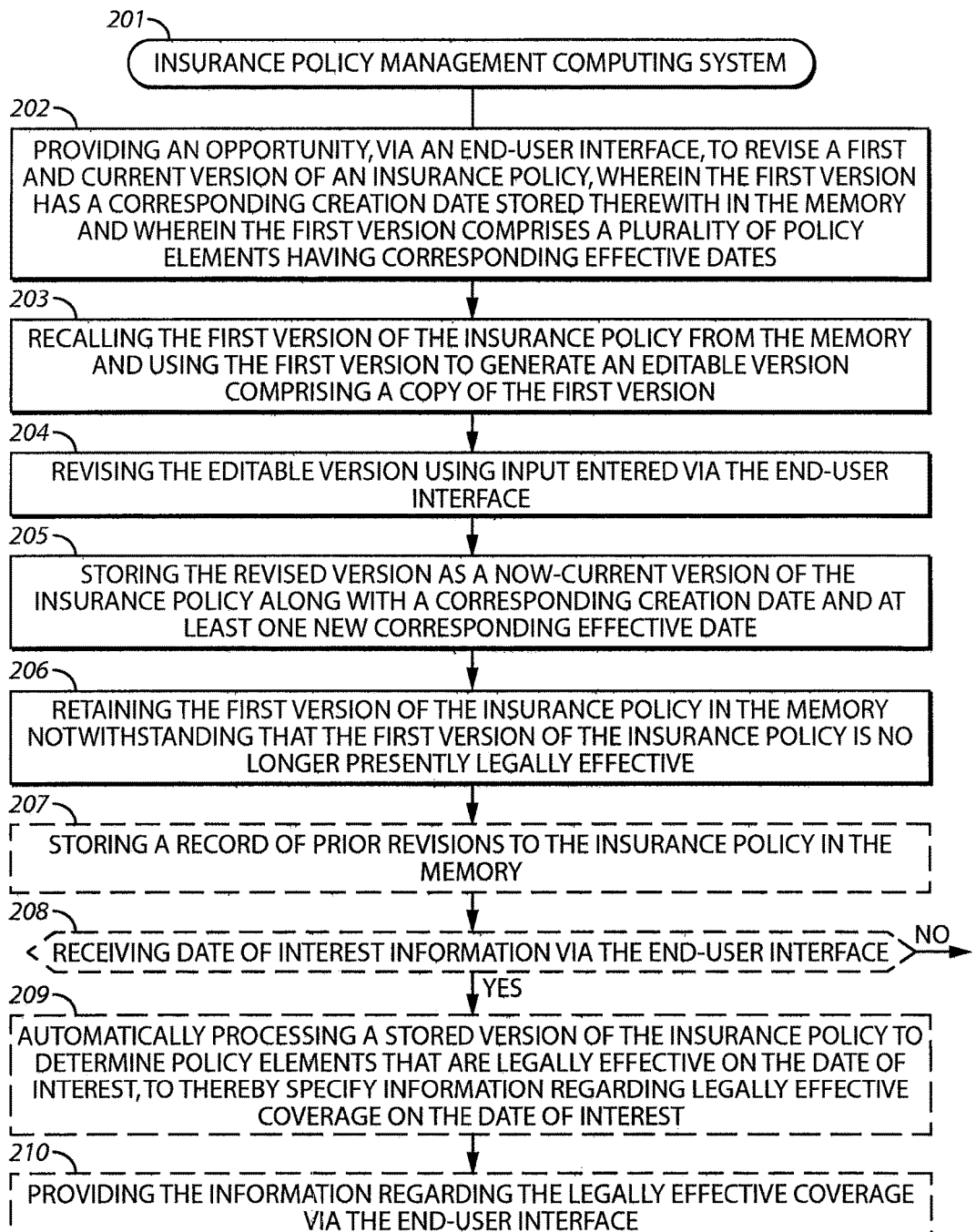
FIG. 2 comprises a flow diagram as configured in accordance with various embodiments of the invention.

Turning now to FIG. 2, an illustrative method 200 employs an insurance policy management computing system 201. The illustrative method 200 provides 202 an opportunity, via an end-user interface 103, to revise a first and current version of an insurance policy, wherein the first version has a corresponding creation date stored therewith in the memory and wherein the first version comprises a plurality of policy elements having corresponding effective dates and fixed identifiers. By one approach, the first version is the most recent policy to be made legally-effective. The corresponding effective date may be a master effective date that applies across all of the elements such as would be created at the creation of the policy. Alternatively, different policy elements may have different effective dates. As used herein, the policy elements include the constituent parts of the insurance policy including: covered items such as a vehicle; coverages; and terms relating to the coverages such as a limit or a deductible term, to note but a few policy elements. The policy elements comprise start effective dates and end effective dates, indicating the date range over which the element is effective for the policy. The policy elements further comprise fixed identifiers, such that two policy elements with the same fixed identifier and different effective date ranges can be identified as representing the same underlying element existing in different date ranges.

An insurance policy is effective for a contractual period that extends from the date the policy goes into effect (the effective date) to the date the policy expires (the expiration date). The insurance policy itself not only has an effective date but so too can constituent elements of the policy. For example, the insurance policy may have a contractual policy period of one year, but several of the policy elements may only exist or be effective for some portion of that effective time thereby having different effective and expiration dates than the insurance policy. A change made to a policy also has both a change date and an effective date. As stated, the effective date of an insurance policy is the date the policy goes into effect, whereas, the effective date of a policy change is the date on which that change becomes legally effective. The effective date of a policy change can comprise a present, retroactive, or future date.

The policy period can be any length of time and start on any date of the year. For example, the period can be one year, six months, three months, or any arbitrary length. Nonetheless, generally one policy cannot have contractual periods with overlapping effective date ranges, not including sections of contractual periods where a policy may be cancelled or rewritten. Typically, when a policy renews, the renewal creates another contractual period with a different effective date range. For example, the renewal of a policy with a 2009 policy period would recall and copy the currently legally-effective policy for 2009 to create a new version of the policy for a new contractual period with different effective dates for 2010. To track the various insurance policy versions, the insurance policy management computing system 201 may assign an insurance policy a unique identifier such that the identifier links all insurance policy versions including all versions for that contractual period and for prior contractual periods. In addition, other policy elements may have unique identifiers as discussed below.

While a policy is in force as of a particular effective date range, the creation or modification of the policy occurs at a date in actual, real-world time that may not correspond to the start effective date of the policy. Indeed, the change date of the policy creation will often lie outside of the effective date range. The change date of a policy change is the date on which the change was actually made. For example, when a version of the insurance policy is bound, thereby becoming the legally-enforceable insurance policy, the insurance policy management computing system 201 records the actual date that the binding occurred with the policy version as the change date. The change date may be different than the date the policy actually goes into effect.

Returning to FIG. 2, in preparation to revise the insurance policy, the illustrative method 200 recalls 203 the first version of the insurance policy from the memory and uses that first version to generate an editable version comprising a copy of the first version of the insurance policy. Since the current legally-binding first version of the insurance policy represents a legally-binding contract that cannot be altered without recording an agreed-to change by parties to the contract, it is stored in read-only format. Thus, to revise the insurance policy, an editable copy of the current version of the insurance policy is saved in the digital memory 101 such that changes may be made thereto. In addition, the editable version is generated from the first version of the insurance policy because that is the currently legally-binding insurance policy.

Since each change to the policy results in the creation and storage of a new version of the policy, over time a large number of policy versions may be stored. To track the various versions of the insurance policy, the insurance policy management computing system 201 may assign a version, a sequence, or a model number. Further, the computing system 201 may determine the number assigned to the version by incrementing the previous insurance policy's revision model number, typically an integer value, when an insurance policy is bound or saved as the non-editable, currently legally-binding insurance policy. Therefore, the model numbers that are associated with each of the versions of the insurance policies indicate the relative order of multiple version of the same contractual insurance policy and the insurance policy with the latest revision model number is always the currently active, legally-enforced insurance policy for that effective time range. For example, while the illustrative method 200 recalls 203 the first version of the insurance policy to make the first set of changes to the policy, to make subsequent revisions, the computing system 201 will recall the version of the insurance policy with the latest number or highest version model number. Once the updated version becomes legally biding, the updated insurance policy is then given a version model number that is one larger than the previous insurance policy's version model number and supersedes the previous insurance policy though the previous policy versions are kept as discussed below.

As noted previously, since each change to the policy results in the creation and storage of a new version of the policy, over time, a large number of policy versions may be stored. For large policies that change frequently, this may result in storing a very large amount of data. Instead of storing the complete record of each policy version, the system may compress previous versions of the policy to save space. By one approach, the system is configured to store the currently legally-binding policy version in its entirety, and then to store each prior version by recording only the differences between that prior version and the immediately subsequent version by model number. In this case, prior versions can be reconstructed by successively applying changes from the subsequent version. Since most operations occur relative to the currently bound version (which is stored intact and does not need to be reconstructed), this approach is efficient.

The editable version of the insurance policy is revised 204 based on input entered by the end user at the end-user interface, which is incorporated into the editable version to provide a revised version of the policy. Once the editable version of the insurance policy has been updated with the input revisions, that revised version is stored 205 as a now-current version of the insurance policy, along with a corresponding change date. By one approach, by saving the revised version as the read-only, now-current version, that insurance policy is bound into a legally-binding document. In addition, the model number associated with that version is increased so that the current, legally-binding document has a larger model number than any previous version of the insurance policy. Further, once the insurance policy has been bound, even for a short period of time, such as a few seconds, subsequent revisions create an editable copy of the entire legally-bound insurance policy to generate new a revised insurance policy. Storing 205 the insurance policy is sometimes referred to as binding or promoting the draft of the insurance policy into a legally-binding document.

As shown in FIG. 2, the method 200 also includes retaining 206 the first version of the insurance policy in the memory notwithstanding that the first version of the insurance policy is no longer presently legally effective. During subsequent revisions, the method 200 retains previous versions of the insurance policy that are no longer presently legally effective. Thus, a record of prior revisions to the insurance policy is stored 207 in the digital memory 103. A complete record is used for a variety of insurance business processes such as evaluating claims, fraud, and billing, to note but a few.

Figure 3A:
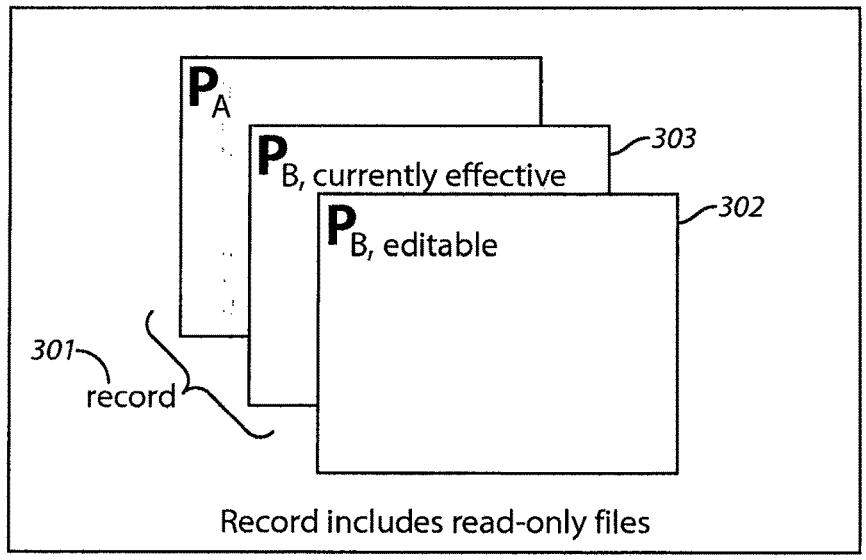
FIGS. 3A-3B comprise a schematic block diagram as configured in accordance with various embodiments of the invention.
Figure 3B:
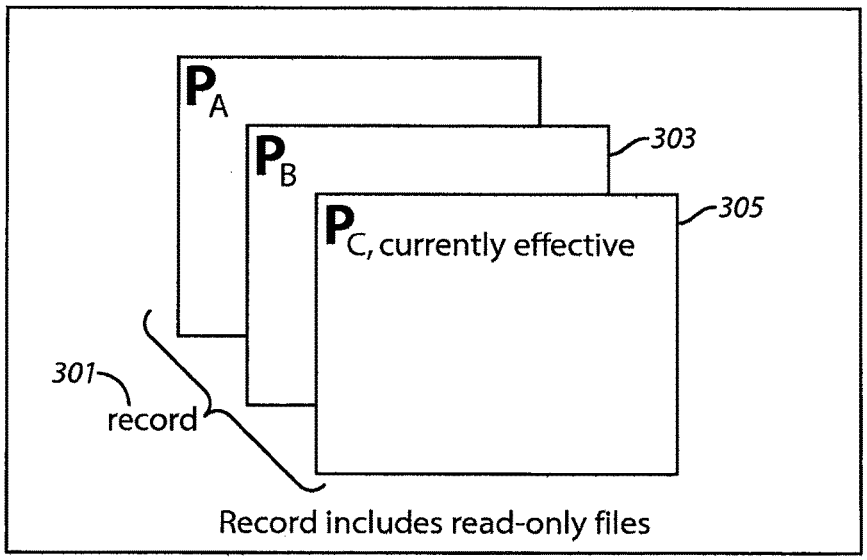

Turning now to FIGS. 3A-3B, prior versions of the insurance policy are retained as a part of the record 301. The record 301 includes all prior versions of the insurance policy, along with the currently legally-binding insurance policy such that the record is a complete history of the first version of the insurance policy and each revised version of the insurance policy that was legally effective for some period of time. As used herein, a period of time is more than zero seconds. In the illustration of FIG. 3A, the editable version of the policy $P_{editable}$ 302 is a copy of the currently effective policy $P_{B, \ currently \ effective}$ 303, which as a legally-effective policy is no longer editable. Therefore, to make changes to the insurance policy, the currently effective policy $P_{B, \ currently \ effective}$ 303 is copied to create $P_{B, \ editable}$ 302, which remains editable prior to its binding into a legally-effective policy. Once $P_{B, \ editable}$ 302 is promoted to a legally-effective policy $P_{C, \ currently \ effective}$ 305 and made read-only, $P_{C, \ currently \ effective}$ 305 is then added to the record. Further, even after an editable version is generated from $P_B$ 303 the version that is copied, $P_B$ 303, remains legally-binding until the editable version is promoted or bound into a legally-binding insurance policy. Thus, while $P_{B, \ currently \ effective}$ 303 is the now current policy in FIG. 3A, since there can be only one legally effective policy for a single time period, when the $P_{C, \ currently \ effective}$ 305 is bound, then $P_B$ 303 is no longer the currently effective policy, though it is retained for the record 301. Further, if additional changes are desired, the read-only, legally-binding version $P_{C, \ currently \ effective}$ 305 is used to generate an editable version into which additional edits may be entered.

Multiple editable copies may be created from a single currently effective version; although there can only be one bound, currently legally-effective version of the policy for a given effective date range, there may be multiple editable copies corresponding to different changes. By allowing a user to create multiple editable copies from a single version, a user may create and then compare the multiple editable copies that were created from the currently effective version. For example, a user may input different policy changes in two different editable copies, which are based on the same currently effective version, and then these two edited copies may be compared to provide two different quotes for the different policy changes. It is also possible for one of the editable copies of the policy to be created as a copy of another, unbound version of the policy; these two copies are then based on the same original bound version, but are editable independently, and both contain a complete copy of the policy. As a further example, the user could create an initial submission for a policy, copy the initial submission to create a new editable version and then input different deductible values into the new editable version, and, then, the user may quote both versions (the initial submission and the new editable version) to compare the prices. The user could then decide which version, if any, to bind, at the same time discarding the other version. In one approach, these multiple versions are themselves linked together by a higher-level element known as a job. A job can contain any number of policy versions, all of which are based on the same original bound version (if any). Nonetheless, it is anticipated that only one version of the policy from such a job becomes bound and legally-effective.

It is also contemplated that multiple jobs, based on the same policy version, may be in process simultaneously. For example, an insured may make two separate requests for policy changes by mail; these changes may be processed at the same time by different employees at the insurer, resulting in two different jobs, each containing an editable copy of the policy being worked on simultaneously. These two copies may be bound at different items (potentially very close together) since only one version of the policy can be the currently effective version for a given effective date range. Binding these two editable copies based on the same initial version introduces additional problems, including the potential for conflicting changes, which are described below.

Since the insurance policy management computing system 201 may retain numerous insurance policies in the record 301, the computing system 201 may need to identify whether elements in the policies are different or correspond to the same underlying entity. Thus, the computing system 201 may assign an element a fixed unique identifier. For example, within a policy a single vehicle may have had its license plate changed. To indicate that the two different license plate numbers are for the same vehicle, the fixed identifier will remain the same for the two elements to illustrate that the license plate on a single car changed, as opposed to having the car itself changed. Thus, even when comparing insurance policies in previous contractual periods, the fixed identifier remains the same for a particular object such as a coverage.

Turning now to FIG. 4, illustrating versions of an insurance policy over two contractual periods. As mentioned above, each insurance policy has a policy period identifier 401 associated therewith. For example, the policy period identifier, shown in FIG. 4 as identifier 401 for the contractual period 2009 it is '123'. Further, for the subsequent contractual period in 2010, the policy period identifier 401 is '456'. The policy period identifier 401 for the contractual period 2009 ('123') remains constant for all insurance policy versions effective for that period. While the policy period identifier remains the same throughout the period, every time the insurance policy is revised to create a new version of the policy during that period, the model number 402 is increased. This also indicates which policy version is the now-current, legally-binding insurance policy. A policy also has a fixed identifier that remains constant across periods. For example, in FIG. 4, the fixed identifier '54321' indicates that different versions of the policy are versions of the same policy. The example policy '54321' has period '123' and period '456' and both are versions of the same policy with different effective date ranges, and not completely different policies, as indicated by the fixed identifier.

In the example of FIG. 4, a new auto policy is created for a red vehicle for the policy period '123' and the first version 40 of the policy is saved. To modify the first version 40 of the insurance policy, the insurance policy management computing system 201 recalls 203 the most recent version of the policy, as discussed above. In FIG. 4, the most recent version of the policy is indicated by the version with the highest model number 402. To alter the first version 40 of the auto policy, the computing system 201 copies the first version 40 into an editable form such that the policy elements may be changed. In this example, the previously red vehicle is painted blue. The computing system 201 indicates that a single vehicle's color has changed, as opposed to changing from a red vehicle to a blue vehicle, by retaining the same fixed identifier 403 and, therefore, the car itself does not change, although the color has changed. The second version 42 of the insurance policy is saved as the new legally-binding insurance policy. To make another change to the policy, the entire legally-binding policy including the previous changes found in the second version 42 are copied into an editable form. FIG. 4 illustrates another change, a change in vehicle, to the 2009 policy period '123'. In the third version 44 of the auto policy, the previous vehicle with a fixed identifier 403 of '12345' has been removed, and a new vehicle added with a fixed identifier of '67890'. Further, the model number 403 has increased. As illustrated in FIG. 4, the entire previously legally-binding policy is copied and subsequently changed. Therefore, to evaluate what the auto policy covers at a particular date, the current legally-binding policy is determined by locating the highest model number.

For a variety of insurance business processes, a user will need to know the legally effective policy elements at a certain date. Thus, the method 200 is configured to receive 208 a particular date of interest via the end-user interface 103. Upon receiving the date of interest, the method 200 automatically processes 209 the stored version of the insurance policy to determine the policy elements that are legally effective on the date of interest to thereby specify information regarding legally effective coverage on the date of interest. Determining the elements that are effective involves finding elements within the policy with effective date ranges overlapping the date of interest. Such capabilities are sometimes referred to as viewing the policy in slice mode. Further, coverage specifics such as information regarding legally effective coverage may be provided 210 via the end-user interface.

For other insurance business processes, a user may prefer to view a policy over a period of time, as opposed to at one certain date. Such a function is often desired for certain complex commercial insurance policies where the user may want to view a sequence of changes or related values over the full period of the policy or a sub-period such as a business quarter. In such situations, the user may also desire to change policy elements over the period of time as well, as discussed in more detail below with respect to window mode capabilities.

As discussed above, an effective date is the date the policy or policy change takes effect and the change date is the date the policy change or policy creation occurred in real time. Further, policy changes are viewable as of their effective date or their change date. By choosing a policy version by comparing the change date of the policy version with a date of interest, the policy can be viewed as it actually existed at a given point in real time. Within a given version of the policy, the effective date ranges of the policy elements show the policy changes as of the date the changes to those elements became effective, not necessarily when those policy changes were made.

As mentioned above, the interface 103 may be employed to convey and receive information from an end-user. Turning now to FIG. 5, an illustrative screen shot 500 of the user interface 103 displays an insurance policy summary 501 for a user. The insurance policy summary 501 may include various details pertaining to the policy including policy number, policy type, coverage period, and account information, to note but a few. The illustrated example policy no. 40684, depicted in FIG. 5, is a personal auto policy having an effective date of Jan. 31, 2009 and an expiration date of Jul. 31, 2009, as illustrated in the "Period" section of summary section 501. Also shown in the illustrative screen shot 500 is a policy transaction listing 502. Policy transactions include policy creation or submission, policy changes, claim submissions, and changes to personal information (such as a billing address change), to note but a few. A policy transaction generally results in a new policy version incorporating one or more changes to the policy, with a change date corresponding to the date the transaction occurred. In screen shot 501, the transaction depicted in the policy transaction listing 502 is a policy submission, which creates the policy. This policy transaction occurred, or was recorded on, Jan. 15, 2009 as illustrated in the "transaction close date" column. Thus, while Jan. 15, 2009 is the change date, the effective date is Jan. 31, 2009. In the left column of screen shot 500, the query date 503 illustrates the effective time of the policy such that the summary information shown is as of that date. Therefore, by setting the query date 503 to the policy effective date of Jan. 31, 2009, the personal auto policy that went into effect that day is shown in the summary section 501.

If the user would like more information regarding the illustrative example policy no. 40684 created on Jan. 15, 2009, the user can click on the 'work order' that created or submitted the policy in the policy transactions listing 502. In addition to selecting the submission work order in the policy transaction listing 502, the top left of screen shot 500 includes a dropdown menu 504, which includes various operations and information that the user may access. In the 'Actions' dropdown menu 504, previous transactions may be listed and selected.

Turning now to FIG. 6, screen shot 600 illustrates a Policy Review having policy details displayed including the named insured, product, policy period, details of the coverage such as policy level coverages, vehicles covered, and vehicle coverages. In FIG. 6, the illustrative policy submission no. 166048 was bound or made legally-enforceable, as of the effective date of Jan. 31, 2009. The illustrative policy no. 40684 is an auto policy that covers a single vehicle with a vehicle identification number (VIN) of 12333 with a model year of 2000 for a Honda Civic. The illustrative insurance policy has an Auto Liability Package 607 with a coverage of 250/500/100. In addition, the Comprehensive Deductible 608 and Collision Deductible 609 are both set at 500 in the example.

Figure 7A:
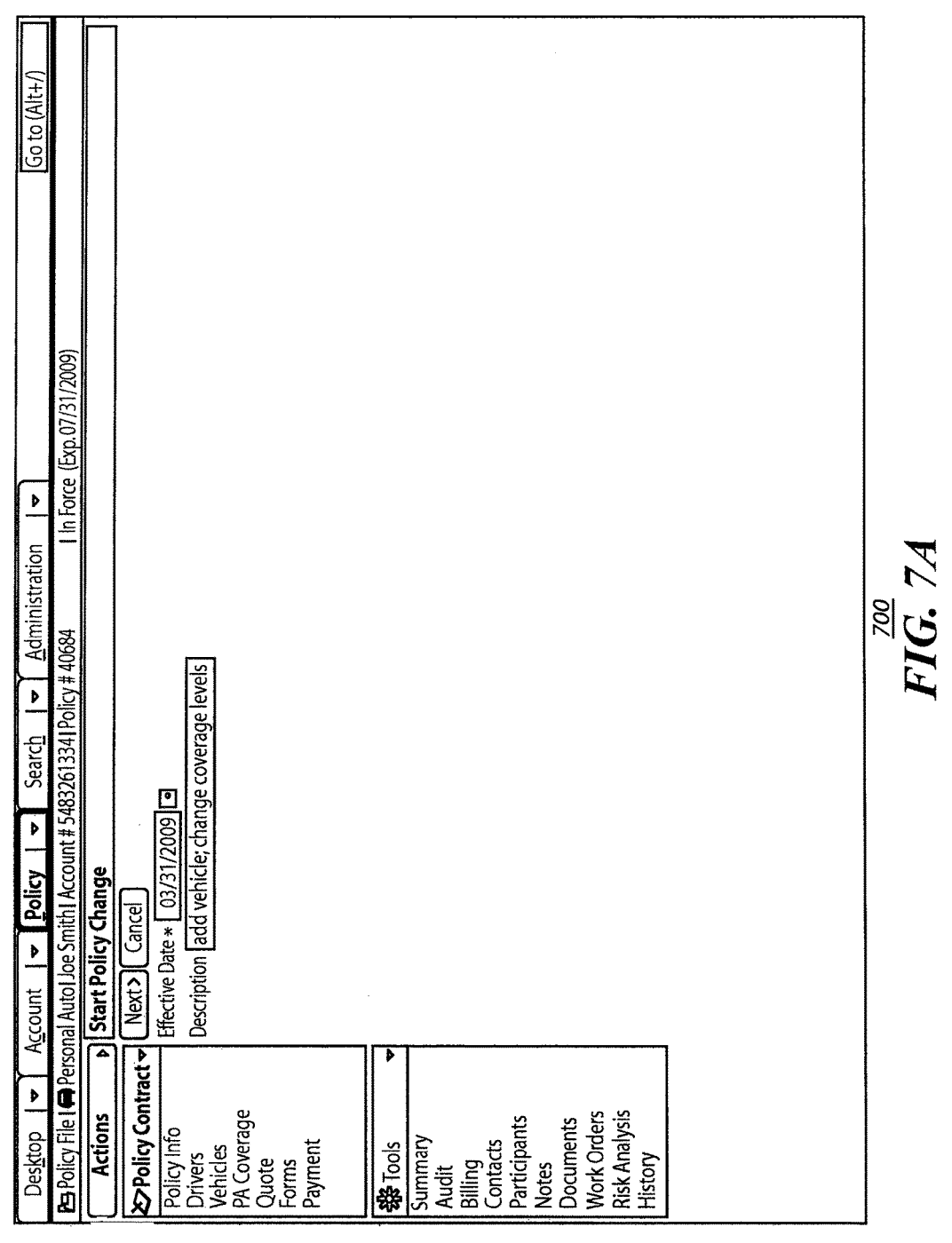

Policies are often changed to accommodate various policy holder requests, to reflect changing circumstances, or to correct information previously entered. To accommodate such changes, the insurance policy may be altered in a variety of manners but it is important that the policy history be retained. In FIGS. 7A-7B, the illustrative policy no. 40684 is edited using slice mode. As mentioned above, slice mode capabilities permit a user to input a particular date of interest such that the computer system 201 will query the policy to determine the insurance policy and its elements effective on that date of interest. When inputting policy edits in slice mode, which displays the policy as of the particular date of interest, the computing system 201 incorporates edits to the policy as of a particular effective date. Screen shot 700, in FIG. 7A, shows the beginning of a policy change where the user is asked to input an effective date for the change and to input a policy change description. In this illustration, the effective date of this change is set to Mar. 31, 2009 and described as "add vehicle; change coverage levels." The model or change date retained by the computing system would be whenever the policy change occurred. For example, if the policy change is input on Mar. 15, 2009, the system retains this date for subsequent audits, along with other functions.

In addition to inputting the effective date and the change description, the end-user interface 103 permits the user to input the associated details with the policy change. For example, if the policy change concerns adding a vehicle, the user will be prompted to input various basic vehicle information including vehicle identification number (VIN), make, model year, and vehicle type, to note but a few. In addition, to change the policy coverage levels, the user may be prompted to select the particular type of coverage and coverage limits. Once the changes have been input, the system may display the differences and changes, such as illustrated in FIG. 7B. In this example, coverages were added 708 and coverages were changed 709. In this illustrated policy change, a vehicle was added 708 in California and the liability was changed 709. More particularly, the liability for bodily injury and property damage was changed from 250/500/100 to a million and the comprehensive and collision deductibles were changed from 500 to 1,000.

A policy element that is changed as of the effective date specified by the user, in slice mode, can be viewed as splitting the policy element into two pieces: a first policy element piece comprising the original element before the change and a second policy element piece comprising the changed element. In the case of a change to an existing element, the element is copied to create two elements, the original, which has its end effective date set to the effective date of the change to indicate that it applies only up to the change date, and the changed element, which has its start effective date set to the effective date of the change to indicate that it applies after the change. As discussed before, the two new elements share the same fixed identifier (which was preserved during the copying operation), which indicates that the elements refer to the same underlying entity. In this example, the liability coverage 709 was changed, resulting in an original liability coverage element with value "250/500/100" with start effective date Jan. 31, 2009 (the start date of the policy period) and end effective date Mar. 31, 2009 (the effective date of the change), and a changed coverage element with value "1M CSL" with start effective date Mar. 31, 2009 (the effective date of the change) and end effective date Jul. 31, 209 (the expiration of the policy period). The deductibles for Comprehensive and Collision Coverage were also increased and, therefore, will also effectively have split policy elements.

Figure 8:
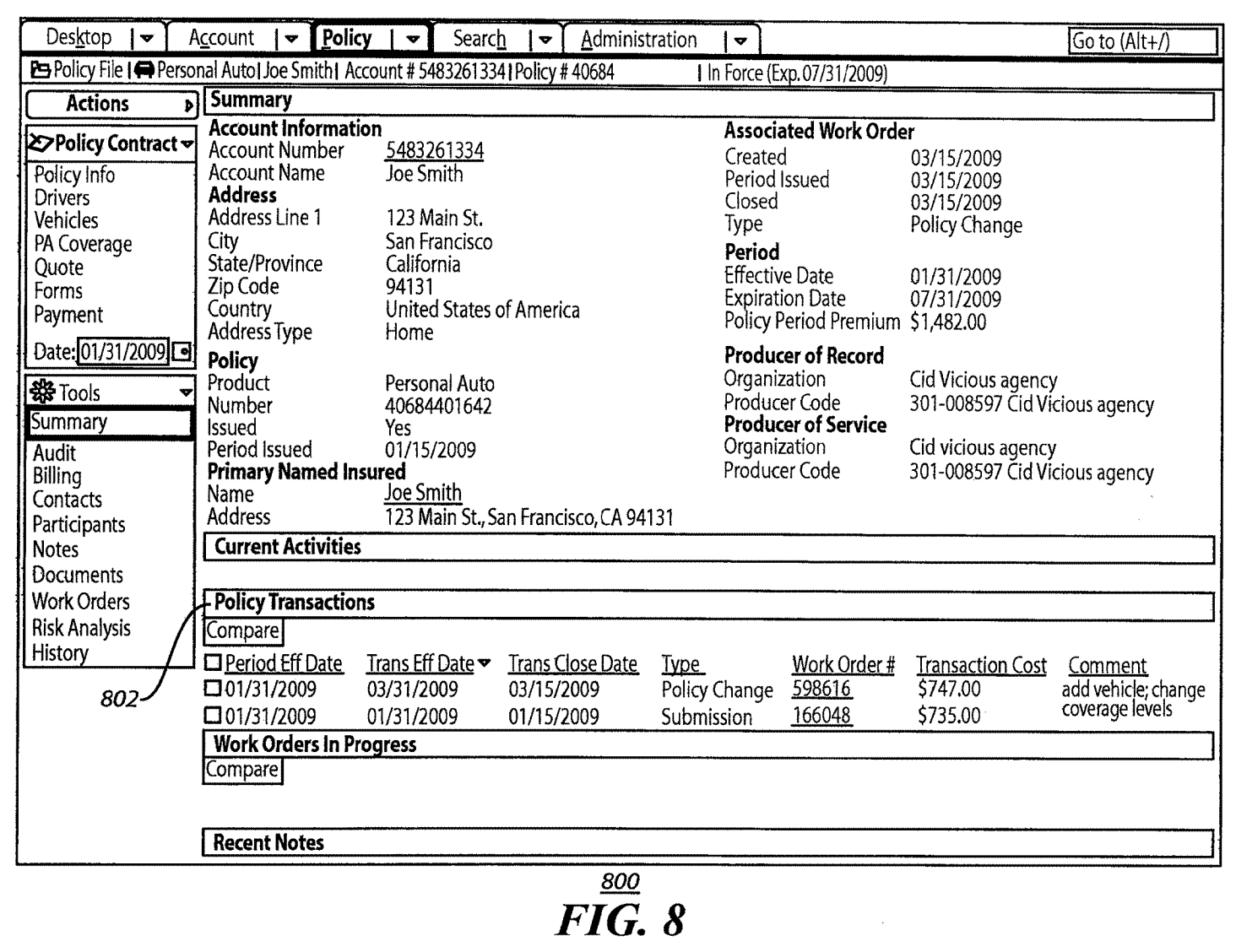

Now that the illustrative example policy has been changed, the policy transactions listing include an original submission or creation transaction and a policy change transaction, as illustrated in the policy transactions listing 802, shown in FIG. 8. From screen shot 800, the user ascertains that the original policy submission occurred on Jan. 15, 2009, the model date, and the policy went into effect on Jan. 31, 2009, the effective date. Further, the display indicates that changes to the policy went into effect on Mar. 31, 2009, the effective date of the change, but those changes were made on Mar. 15, 2009, the model date.

Depending on the number of alterations to the policy and the manner of alteration in the computer system, ascertaining the coverages in force as of a particular date can become cumbersome in some systems. Thus, insurance policy management computing system 201 is configured to access the most recently bound insurance policy, the policy with the largest model number, which, as discussed earlier, is saved in its entirety. Accessing the entire most recently bound insurance policy allows the system 201 to quickly examine the policy as of a certain date to determine what was covered. Further, to edit the policy, the insurance policy management computing system 201 recalls 203 and copies the policy into an editable version thereby retaining the entire policy. Thus, subsequent changes to the insurance policy are made to an entire version of the insurance policy such that there is no need to recreate the policy by combining a number of alterations.

Figure 9A:
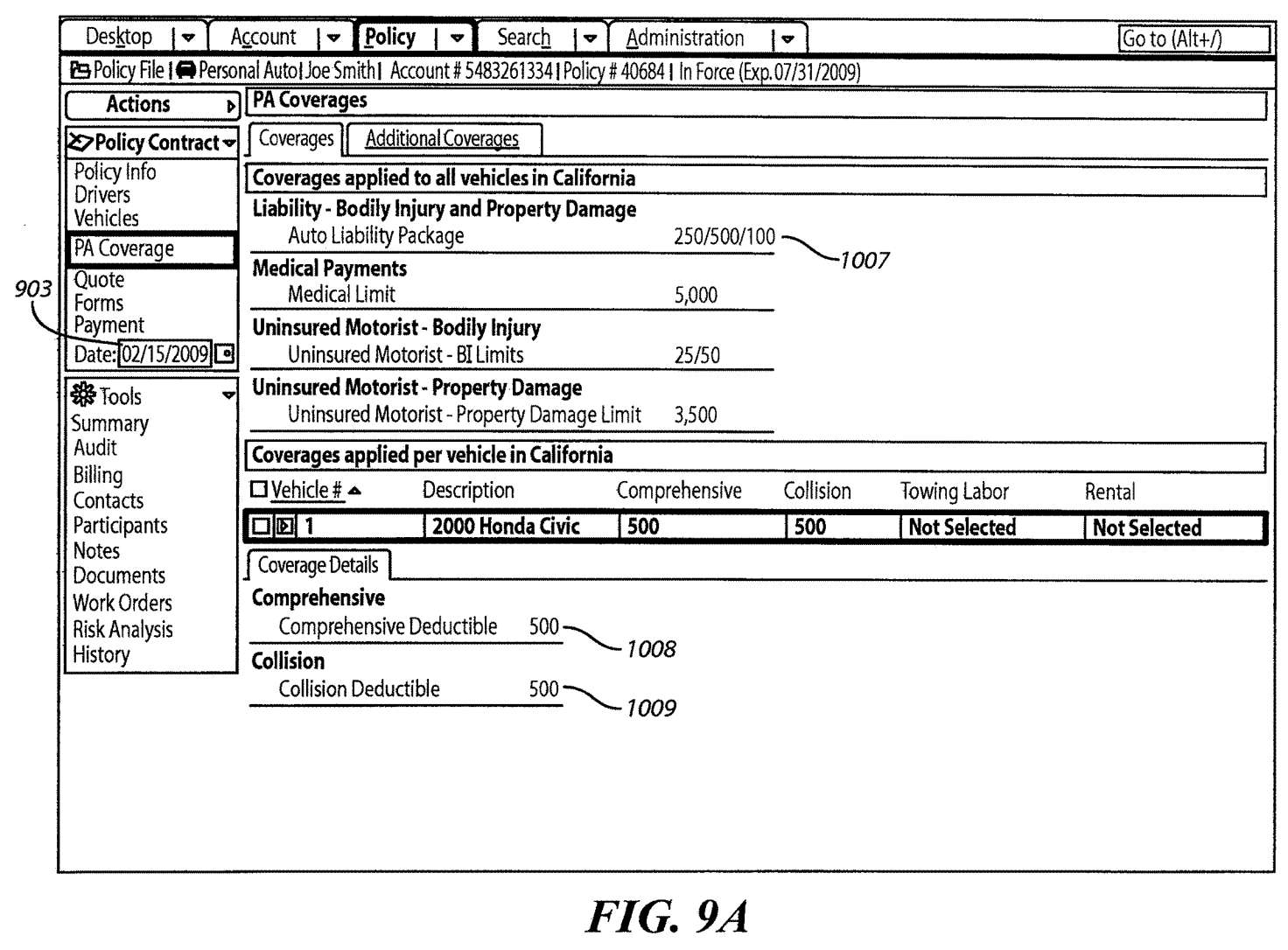

To view a policy as of a certain date, the system 201 may be queried as of a particular date 903, sometimes termed the slice date. As mentioned above, slice mode allows the user to view the policy as of a particular effective date. As shown in FIG. 9A, a query date 903 of Feb. 15, 2009 will display the version of policy no. 40684 that was effective after the submission of the policy but prior to the policy change effective on Mar. 31, 2009. Thus, even if the query is occurring after the policy change was input (Mar. 15, 2009) or became effective (Mar. 31, 2009), the insurance policy management computing system 201 displays the policy that was legally effective on the query date, prior to the policy changes in the illustrative example. For example, in FIG. 9A a slice or query date 903 of Feb. 15, 2009 will return the policy details of the policy that went into effect on Jan. 31, 2009 because the only policy changes input for this policy become effective after the query date of Feb. 15, 2009. More particularly, the coverages in effect in the example policy on Feb. 15, 2009 include an Auto Liability Package 1007 with coverages including 250/500/100 and Comprehensive Deductible 1008 and Collision Deductible 1009 coverage amounts of 500. Further, the vehicles listed on the policy include only the 2000 Honda Civic, as the coverage for the additional vehicle would not be effective as of Feb. 15, 2009. In sum, by searching a particular date, the policy is display in effective time such that the policy details that were in effect as of the date searched are displayed.

While FIG. 9A provided a summary of the policy as of Feb. 15, 2009 prior to the policy changes, FIG. 9B illustrates the policy as of an effective date of Apr. 15, 2009 and, therefore, includes the increased Auto Liability Package and increased Deductibles. More particularly, the query date 903 of Apr. 14, 2009 displays the Auto Liability Package at 1M CSL and the Deductibles 1108, 1109 at 1,000. Further, as of an effective date of Apr. 15, 2009, an additional car, a 2007 Acura RSX, is covered and displayed.

Changes to a policy may be made with effective dates forward and backward in time, which can lead to a number of difficulties. A concern for many insurers is having the ability to make retroactive revisions to a policy, especially retroactive revisions having an effective date that is earlier than other changes. Such a change is considered out-of-sequence if the transaction has an effective date earlier than other bound transactions for that contractual period. An out-of-sequence endorsement (OOSE) arises when a change to a policy has a change date that is subsequent to a previous version of the policy but has an effective date earlier than changes made in the previous version. When an OOSE arises, any existing changes that are legally subsequent (input at an early date but effective at a later date) may need to be reevaluated and/or repriced. Out-of-sequence transactions may arise due to policy changes, such as changes to coverages or details of the property insured, as well as policy cancellation and reinstatement.

Figure 10A:

An example of an out-of-sequence endorsement begins in FIG. 10A. The change to illustrated example policy no. 40684 occurs in slice mode, such that the user inputs an effective date. The policy change is described as "fix vehicle information; change coverage levels" and the effective date input is Jan. 31, 2009. If this change occurs on Apr. 15, 2009, though the policy change is to be effective as of Jan. 31, 2009, the revision is retroactive. Nonetheless, all retroactive revisions are not out-of-sequence transactions. For a retroactive revision to be an out-of-sequence endorsement, another policy change is bound with an earlier change date, and a later effective date.

Returning to the example beginning on FIG. 10A, the "fix vehicle information; change coverage levels" change occurring on Apr. 15, 2009, is subsequent to the "add vehicle; change coverage levels" change that occurred on Mar. 15, 2009 and went into effect on Mar. 31, 2009. Therefore, the "fix vehicle information" occurring on Apr. 15, 2009 and going into effect at the start of the policy, will be an out-of-sequence endorsement.

Figure 10B:
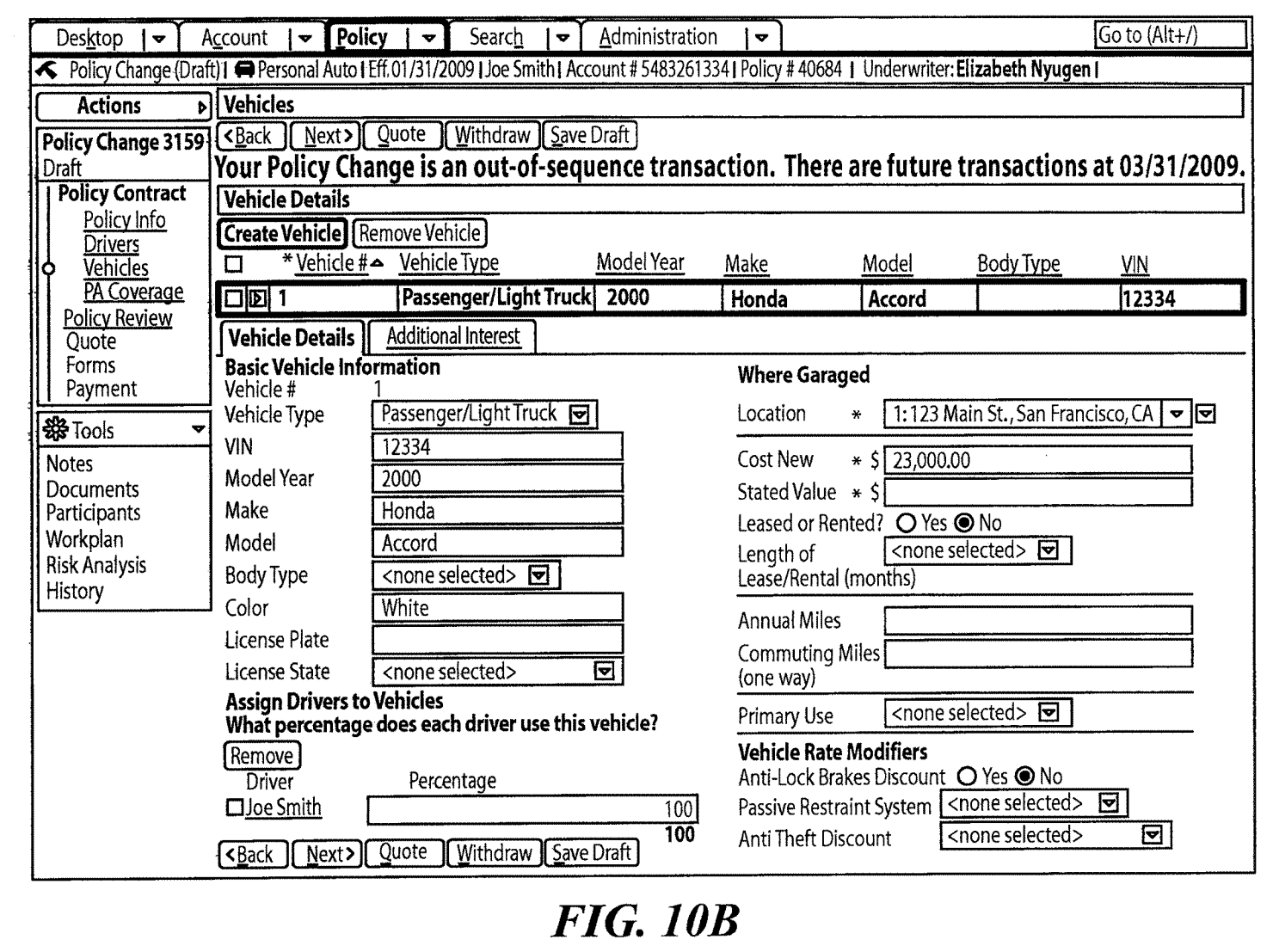

As illustrated in FIG. 10B, the user receives a notification, based on the input effective date and policy history, that the "Policy Change is an out-of-sequence transaction." Such a notification typically occurs at the outset of the policy change once the dates have been input. Further, the notification may indicate future transactions and their effective dates, which may need to be revisited based on the subsequent changes. In FIG. 10B, the user is given the opportunity to make the policy changes, which include changing the vehicle identification number from 12333 to 12334 and changing the Honda Civic to a Honda Accord. In a similar screen, the user is prompted to input the change to the coverage levels. Further, if the collision and comprehensive deductibles are changed to $750, this will directly conflict with the previous change effective Mar. 31, 2009 that changed the deductibles to $1,000. Once the policy changes have been input, the user may be prompted to review the subsequent changes to resolve the conflicts with the out-of-sequence changes.

As mentioned, the user is typically prompted to review the subsequent out-of-sequence changes to determine how to apply changes for the rest of the contractual period. Some conflicts may require user intervention while others may not need any user intervention. Whether the user is prompted to review the changes depends on what changes occurred previously and the changes currently being bound. Further, the computer system 201 detects OOSE automatically. In one embodiment, the user may review the out-of-sequence conflicts in the policy review tab titled Out-of-Sequence Conflicts (FIG. 10C) prior to binding the job into a legally-enforceable insurance policy.

As mentioned, out-of-sequence endorsements are typically detected automatically. Generally, merge conflicts are detected by comparing differences between the two policy versions by matching up changes to elements with the same fixed identifier. Several types of conflicts may arise, including, a direct conflict, where an element modified in a previous change is being modified in a subsequent change that has an earlier effective date and an indirect conflict, such as where an element removed in one revision may be modified in another earlier revision and where an element removed in an earlier transaction may be removed as of an earlier effective date in a subsequent transaction. Where the removal of an element occurs at an earlier effective date, the removal does not really represent a conflict but represents the back-dating of the removal of a policy element. In such a case the removal at the later effective date is effectively ignored. A direct conflict may be where the liability limit had a value of $5,000 in revision A but was changed to a value of $2,000 in revision B, and then to a value of $3,000. The conflict may be detected by noticing that the same field was changed to different values in two revisions. Once the conflicts are detected, the conflicts may then be resolved.

Further, there may be situations where two independent changes do not conflict directly at the field level or at the same policy element overall (as determined by the fixed identifier) but when combined in a single policy revision, those changes together may require additional changes to the policy. For example, suppose an auto policy that includes a car designated as "Special" and is garaged in California is changed so that the vehicle is designated "Private Passenger" and garaged in Kentucky. These changes are to different fields within the policy so they do not directly conflict, however, Kentucky requires additional coverage for all private passenger vehicles and, thus, taken together, these changes require an additional change to the policy, namely adding the Kentucky-specific coverage. Since the system is configured to detect the policy fields and elements that have changed, the policy system can use that information to search for additional policy information needed, even when the changes are individually non-conflicting.

Figure 10C:
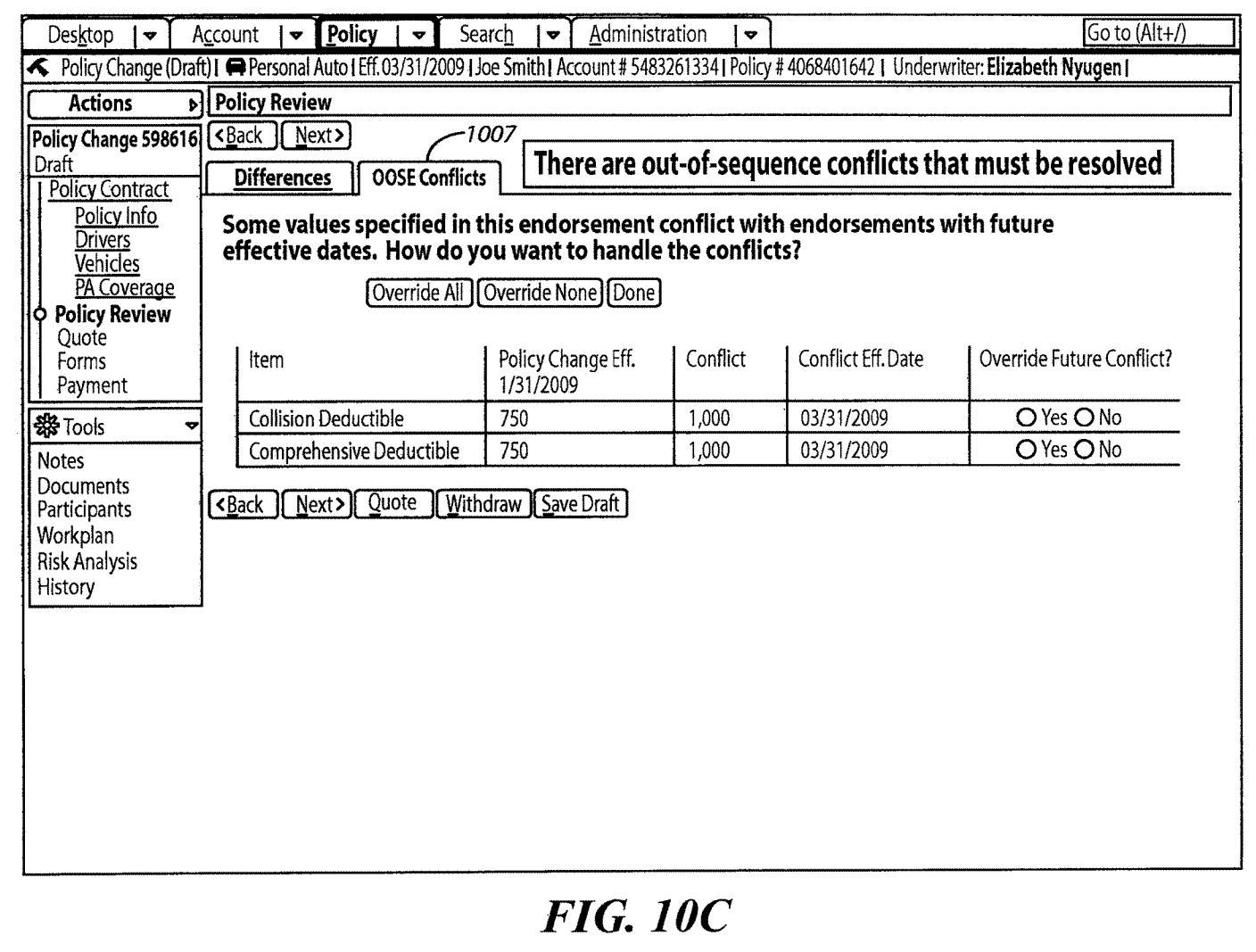

In example policy no. 40684, the subsequent change occurring on Apr. 15, 2009 is to go into effect on Jan. 31, 2009, which is before a change that went into effect on Mar. 31, 2009. After receiving the notification that the policy change is an out-of-sequence transaction and after inputting the various changes, the policy review screen is shown and may include an OOSE Conflicts tab 1007 as shown in FIG. 10C. If, after inputting an out-of-sequence transaction there are no out-of-sequence conflicts, the policy review will display only the same differences it would if there were no out-of-sequence transactions, similar to the screen shot 700 of FIG. 7B. Alternatively, if out-of-sequence issues arise once an out-of-sequence transaction is input, the computer system 201 alerts the user to the issue in a box at the top of the policy review screen as shown in screen shot 1000 of FIG. 10C, prior to binding of the insurance policy.

If the out-of-sequence changes are merged forward to the editable version of the policy, which may be programmed to occur automatically when the endorsements are not in direct conflict, the computer system 201 generally follows several guidelines when merging the endorsements. First, if an element, such as a vehicle, was added in either change, the merged result will include the addition. Second, if an element was removed in either change, the merged result will include the removal. In addition, elements changed in both versions are merged field by field for the newest version. When the same field on the same elements (as determined by fixed identifier) is changed in either version, but not both, the change is propagated to the merged result. When the same field on the same element is changed in both versions, if the values are different the user must review and resolve the conflict as discussed below. If applying merged changes causes validation errors, such as might occur to prevent the policy from binding, the user must choose new values for fields manually.

As mentioned, once the out-of-sequence transactions are detected, the conflicts may be resolved. Further, detecting the conflicts may also include assessing the level of conflict wherein different levels of conflict may require different methods of resolution. When out-of-sequence endorsements are input and they conflict with previous changes, there are several ways to resolve such conflicts. In illustrative example policy no. 40684, the policy review screen includes an OOSE Conflicts tab allowing the user to review each change that conflicts with another change or transaction with a later effective date. The user may than then choose to override or merge later-effective dated changes with the earlier, out-of-sequence change. Over-riding later-effective-date changes has the effect of merging forward the change for the rest of the contractual period. If the user intends to override the future conflict the user would select the 'yes' in the far right column in FIG. 10C. Alternatively, the user may be given the opportunity not to override the future conflict, by selecting 'no' in the far right column, thereby not merging the change forward. For example, if the user wishes to retain the $750 amount for the collision and comprehensive deductibles from the start of the policy throughout, the user would select 'yes' in FIG. 10C. If the user does want to merge the changes forward (the user wants the amount to be $750 for the first period and then increase to the $1,000 amount on Mar. 31, 2009), the user may select 'no'. In addition, the user may select 'override all' or 'override none' to address all of the conflicts at once.

While some policy change transactions are started and finished quickly, others take a long time to complete. Sometimes this delay is due to technical reasons, legal reasons or business reasons. For example, a renewal transaction may start months before the renewal effective date. When transactions take a long time to complete, chances increase that more than one transaction is in process at the same time. Since a policy change is based on recalling 203 the first version of the insurance policy and revising 204 that policy, if two changes were started based on the same policy when the first job finishes there is no problem—the changed policy version is saved normally and becomes the new effective bound policy version. However, when the later transaction—which was started on the same version of the policy—finishes, there may be challenges binding the policy since the transaction that finished second does not include the changes made in the bound policy version based on the same starting version. In sum, when a first job is bound based on the same policy, the subsequent unfinished jobs are preempted by the first version of the policy to be bound. To address such a preemption situation, when a user tries to bind a policy that does not contain changes that it should logically contain given the previous changes, the system computer 201 incorporates these changes. Like out-of-sequence transactions, preemption can occur with cancellation and reinstatement, in addition to policy changes. By one approach, the system attempts to address these problems as soon as a user views a preempted job, as opposed to waiting until the user attempts to bind the preempted job.

Preemption is similar to the problem of applying an out-of-sequence endorsement, at least in that both situations' conflicts may arise between the changes being made to the editable version of the policy and changes made to a previously bound version of the policy. For preemption and out of sequence endorsement situations, fixed identifiers are used to match up elements and determine whether a conflict exists. The same approaches to resolving conflicts arising from out of sequence endorsement may be used to resolve conflicts arising from preemption.

As described above, slice mode is capable of depicting the policy as of a slice or effective date. Further, viewing the policy as of a specific effective date typically will not show any changes or coverages that are not effective as of the effective date in question. Referring briefly to FIG. 11, the user has input a query date of Jan. 31, 2009 for policy no. 49684 and the vehicle identification displayed is 12334 and the car model displayed is an Accord, thereby including the changes made on Apr. 15, 2009. Further, the subsequent changes made to the policy, which changed the coverages and added the vehicle are not effective and, thus, are not depicted in the policy as of the Jan. 31, 2009 effective date.

In addition to querying a policy in its entirety as of an effective date, a particular element of a policy may be examined individually. For example, if an insurance policy covers a number of vehicles, one of the vehicles may be examined to determine what properties and coverages were in effect for that vehicle as of a particular slice date.

The user also may desire to view the policy in a different format, such as to view or browse certain policy elements over time, as opposed to at a certain effective date. For example, for certain features, such as those related to policy quotes, window mode may allow the user to view the policy and its changes over a period of time. Whereas the slice mode displays the policy as of a specific effective date, the window mode may display and permit editing of changes to multiple entities over time. In slice mode an effective date is selected and the policy is displayed as of that date. For example, if the policy includes only one vehicle at that effective date, a policy only covering a single vehicle will be displayed, even though other vehicles may have been covered by the policy at other effective dates. Further, if the policy was cancelled and the slice date queried was after the policy was cancelled, there would be nothing to display. However, if the policy was viewed in window mode, there would be multiple elements visible that represent the car(s) across effective time, with the various values for the colors, the effective dates, the additional vehicles, and the expiration dates. For example, if an auto policy was changed to add a car to a policy mid-year, the car was subsequently changed three times, and was then removed from the policy, there are four different versions of that element across time. In window mode, the user may access those four elements simultaneously, as they are all visible within the effective date range window. Window mode, like slice mode, may be used for a number of different purposes.

For example, window mode may be employed to view the changes to a particular policy element over time, to view summary information that includes all elements on the policy for any period of effective time, such as, when displaying quote information, for directly manipulating computed data such as cost information that represents a value over a period of time rather than at a single point in time, and for direct user entry of aggregate values such as payroll or total sales which represent an aggregate over a period of time, to note but a few.

Example policy no. 40684 is a standard automobile insurance policy, however, other insurance policies, such as complex commercial policies, may employ certain additional features to adequately service policy holder requests and more complex conditions. For example, workers' compensation policies are often priced based upon the total payroll for a given state and class code (class codes typically describe different job functions) over the period of time covered by the policy. In order to correctly price the policy, however, the estimates are typically broken into periods of time that represent when the rates for the policy change, known as rating periods. The dates on which the rating periods start can be due to external factors, such as regulatory changes, or due to changes to the policy itself, such as coverage limit or deductible changes. Window mode permits entering these payroll estimates for multiple periods of time. Slice mode is typically not an appropriate for entering information such as payroll estimates because the value is an aggregate over a period of time and has no single meaningful effective date.

Slice mode operation differs from window mode in at least two important ways. First, a change made in slice mode is always made as of a specific effective date. Any elements changed in this way are automatically split into two elements as described previously, with the original element and its values terminated in effective time at the specific effective date, and the changed element started in effective time at the effective date. The end effective date of the first, original policy element is set to the specific effective date and the start effective date of the second, changed policy element is set to the specific effective date of the change. A change made in window mode, in contrast, simply edits the values of an element without automatically splitting the element into a before and after element.

Window mode operation is also used by the system in order to programmatically modify data while explicitly controlling the effective and expiration dates of the associated policy elements. For example, when pricing a policy, rates are computed that span a particular period of time based on the policy elements, and the system needs to create the appropriate cost elements that span exactly that period of time. As in the previous example, this is a calculation of a value that spans a period of time and therefore may not be meaningfully edited in slice mode. As another example, automatic inference of the forms appropriate to a particular policy transaction (which computes the set of legal forms that need to be produced and sent to the customer once that transaction has completed) relies on the existing policy elements and the resultant forms must have effective and expiration dates matched to the dates of those associated elements.

Out of sequence endorsement handling also utilizes window mode access to the policy. Determining what conflicting changes exist, as described above, includes examining the policy at multiple effective dates, and handling those conflicts can result in edits to the policy made at multiple effective dates. Additionally, processes such as automatic form inference must look at multiple effective dates in the case of an out of sequence endorsement.

As suggested above, slice mode operation and window mode operation have a number of similarities. For example, changes made in both modes result in the creation of a new editable version of the policy, based on the currently-effective version of the policy, and that editable version, once the changes are complete, is bound in the same manner to become the currently-effective policy version. By copying the policy and marking the new version with the actual date of the change (the change date, as described above), the system can retain a complete record of the changes. In the workers' compensation example above, changes to the policy made in window mode such as updating the estimated payroll totals result in the previous values being preserved in policy versions that are no longer effective.

Figure 12B:
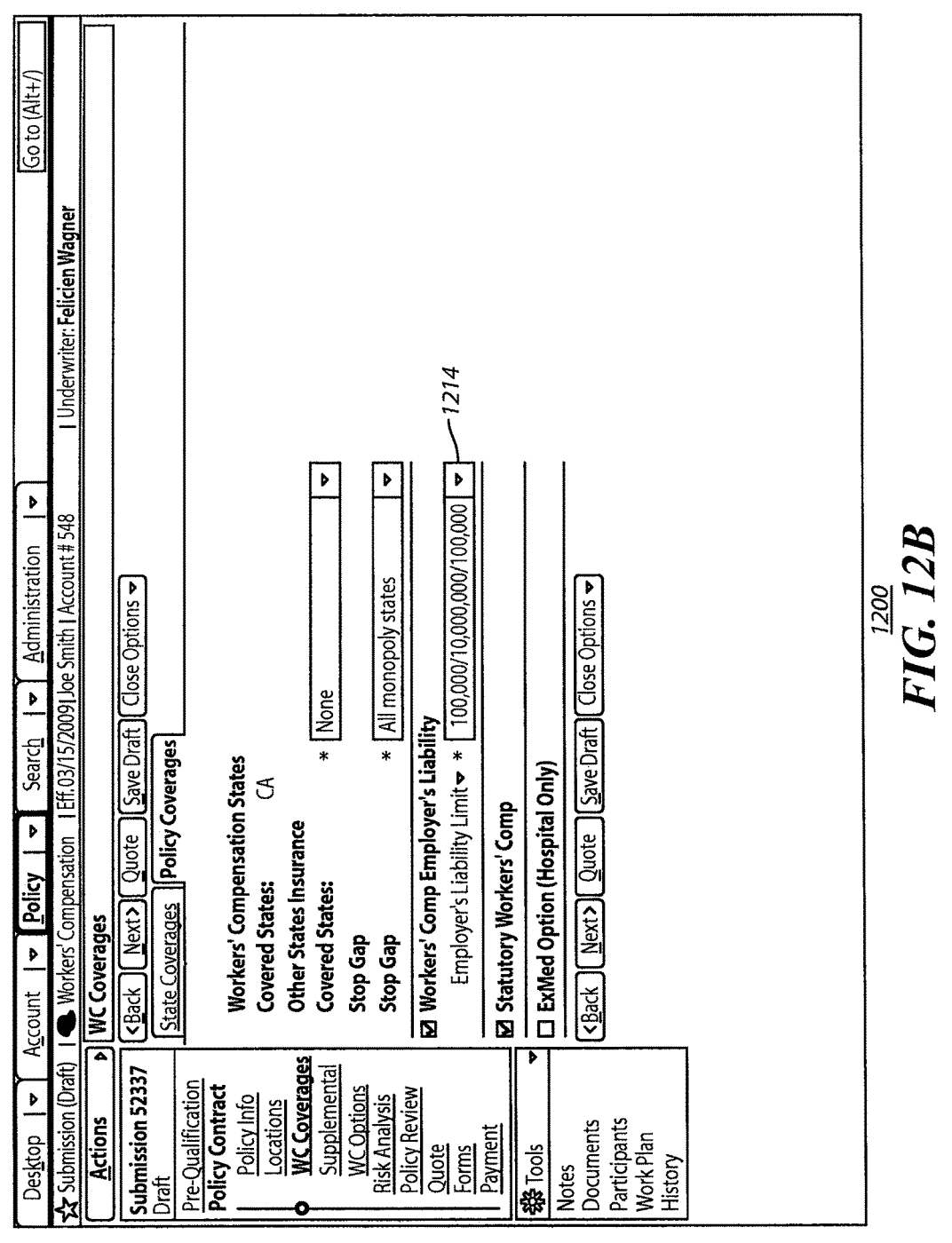
Figure 12C:
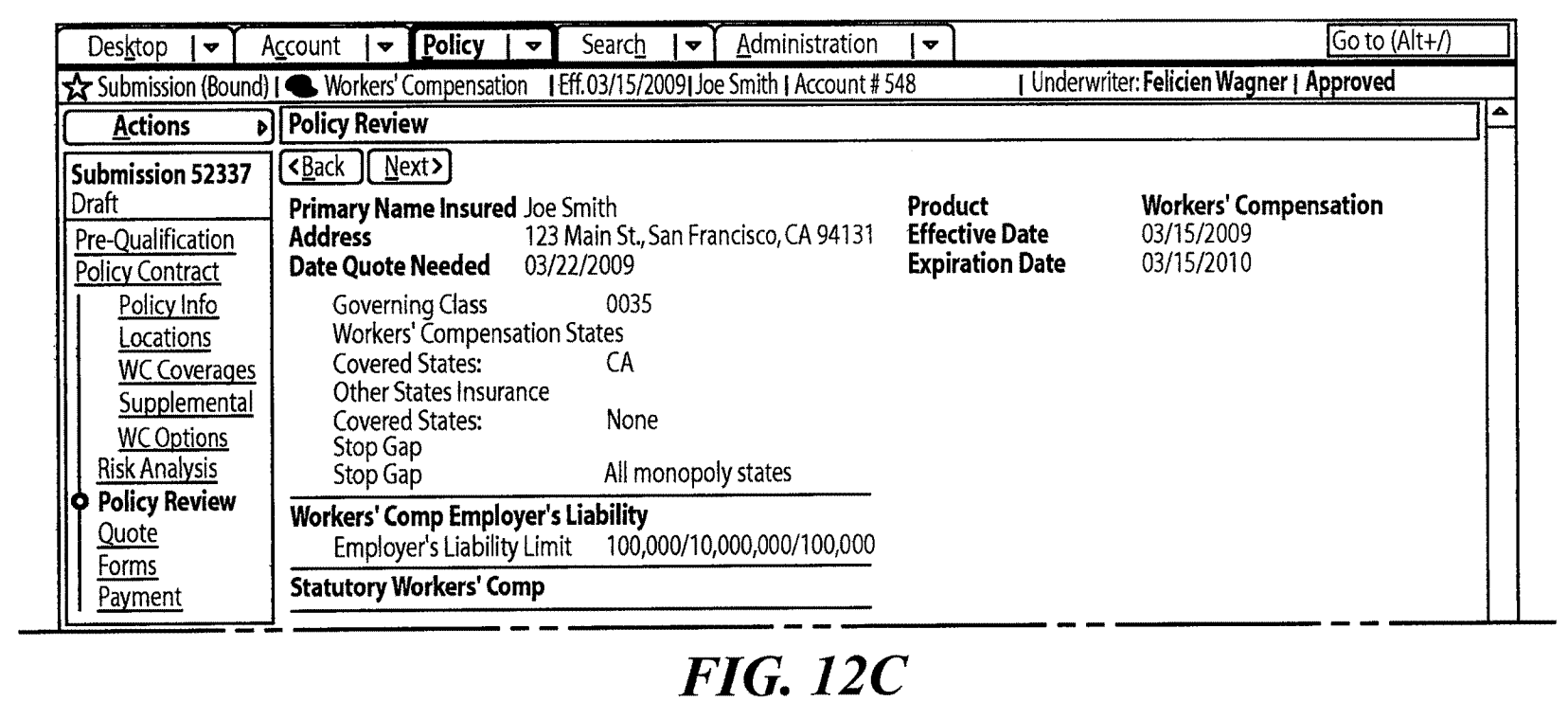

An illustrative workers' compensation policy effective on Mar. 15, 2009 is illustrated in screen shot 1200 of FIG. 12A. In the example of FIG. 12A, the business is a florist with a class code of 0035, having 45 employees, and a basis of $400,000 (as used herein, "basis" is the total payroll used to calculate the premium). This is an example of combined window and slice mode editing. In this policy, the basis of the florists' employee class is edited in window mode. The basis is edited in window mode because the value is the sum of the total payroll for the entire period for which the policy is effective. If the policy were to subsequently be changed as of a later effective dates, edits to the basis would still apply for the entire period of the policy, rather than from the effective date of the change. FIG. 12B shows values that are edited in slice mode as of the effective date of the policy transaction, such as the overall liability limit. The liability limit 1214 shown in FIG. 12B is $100,000, $10,000,000, and $100,000. FIG. 12C illustrates a policy review of the inputs entered in the screen shots of FIGS. 12A and 12B.

As mentioned above, a policy period may be subdivided into rating periods. For example, workers' compensation policies typically have values defined by rating period start dates, which divide the policy values into periods. The rating period start dates may be the date the rate of the policy is changed. This date may be determined by a change to the policy or a change in the governing regulation, to note but a few typical period start dates. The division of the policy into rating periods requires window mode editing in order to input the basis amounts for each period regardless of the effective date of the policy transaction. This division also requires window mode access when pricing the policy, as each rating period needs to be priced separately.

Figure 13A:
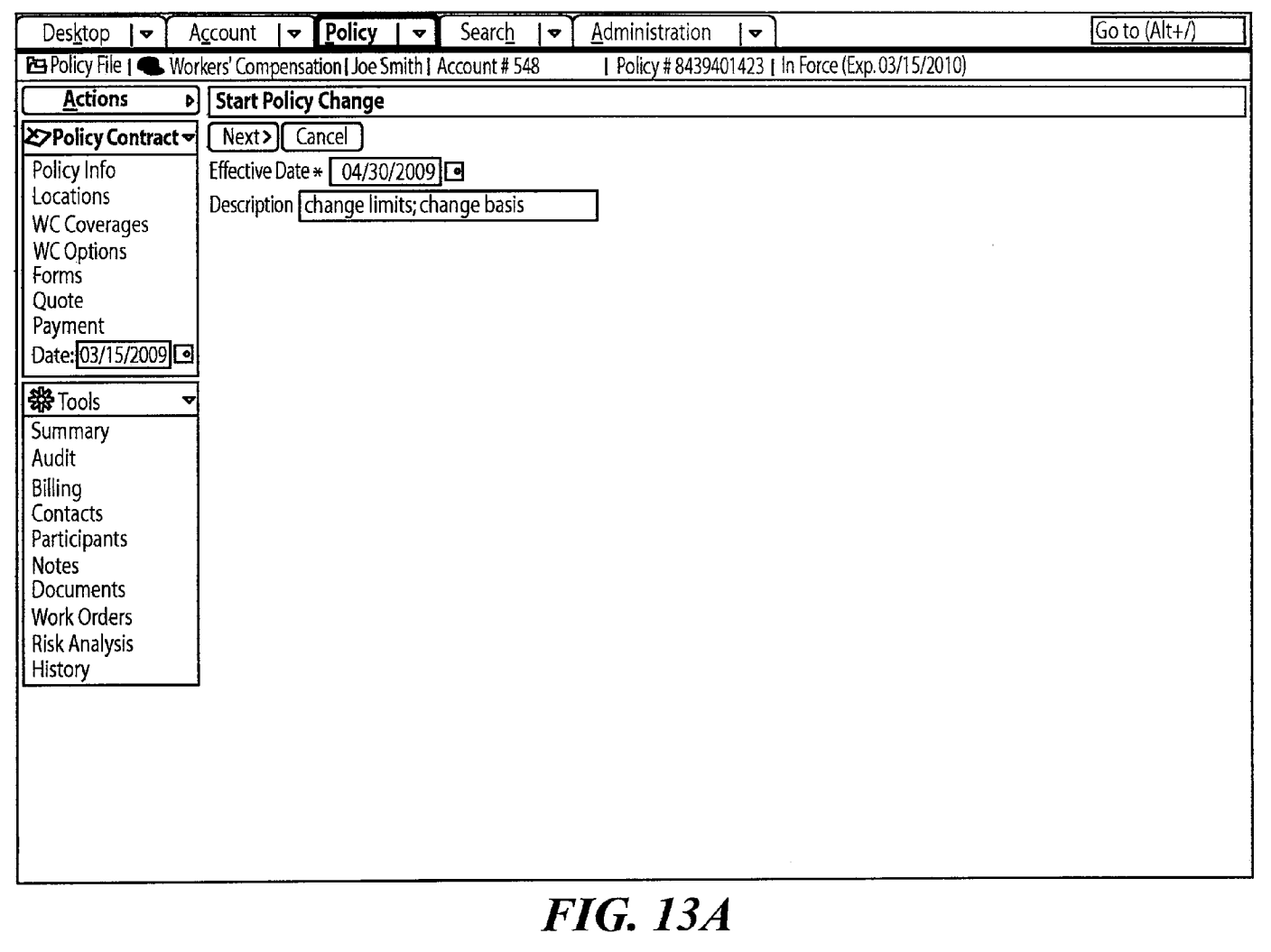
Figure 13B:
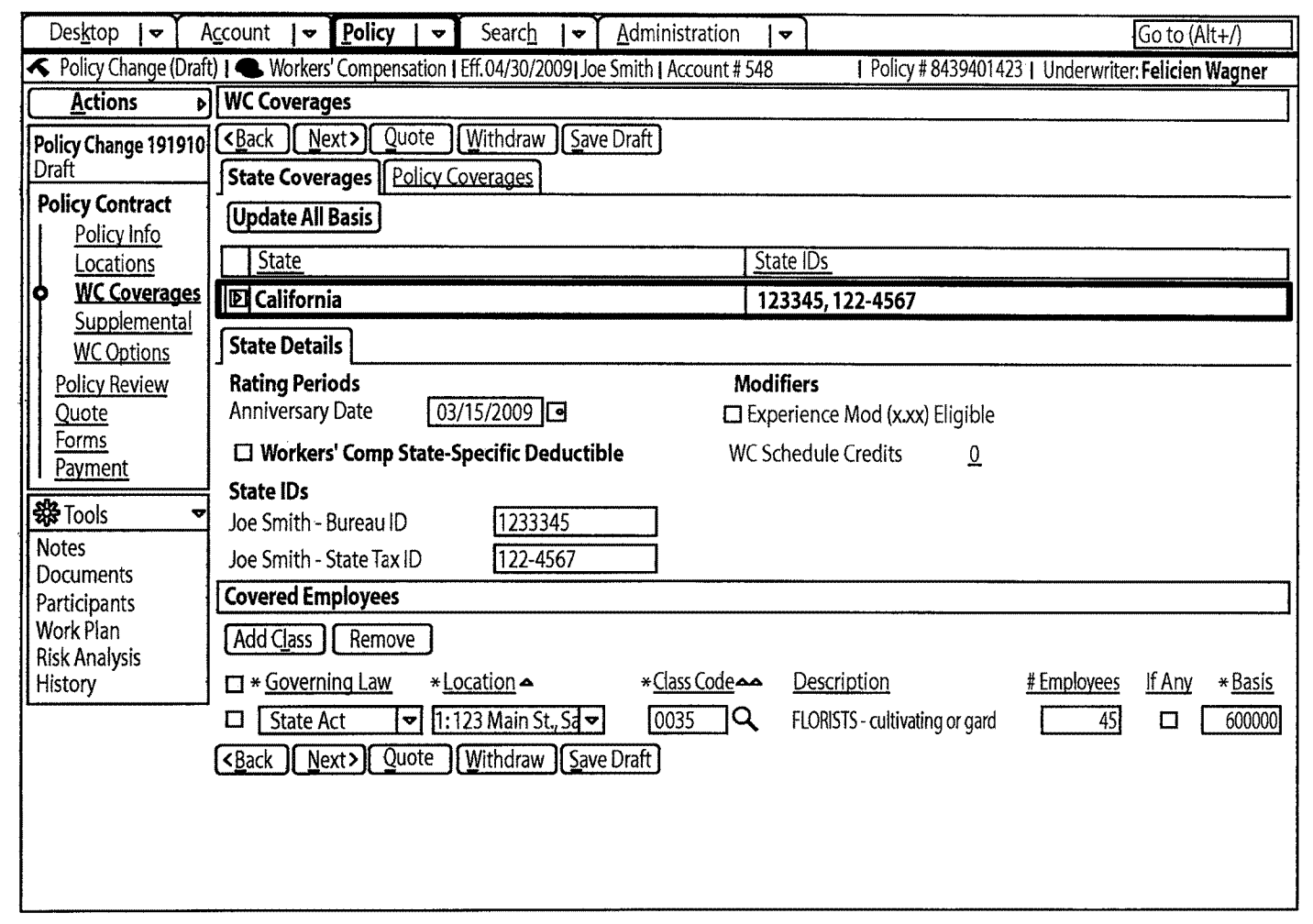
Figure 13C:
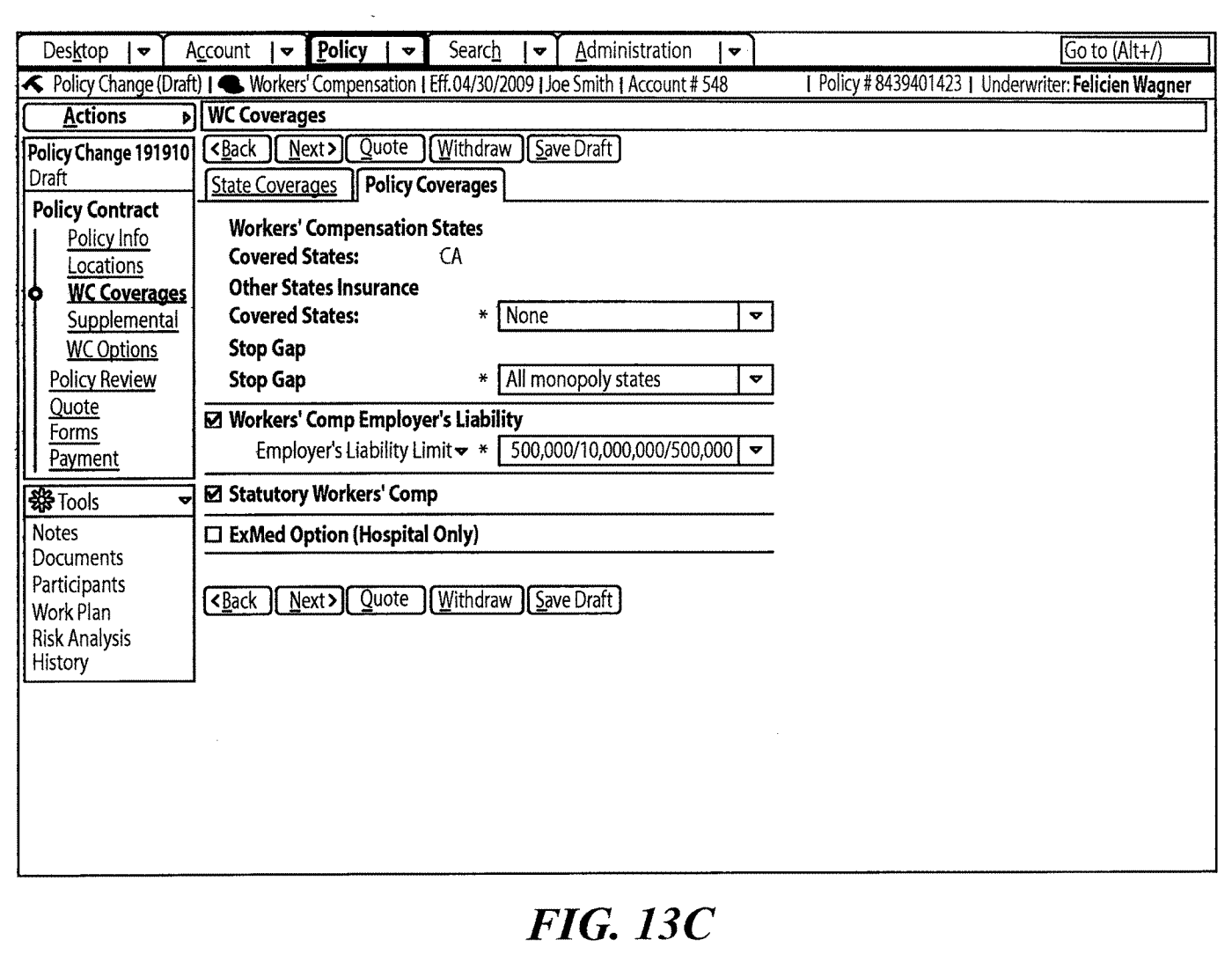
Figure 15B:

In the example policy of FIGS. 12A-12C, the basis for 45 employees is $400,000. However, the $400,000 basis is an estimate and can be updated in the event that a more accurate estimate becomes available. Turning now to FIGS. 13A-13C, a policy change occurs to update the policy to reflect the basis change and to update the liability limit. In the illustrative example, the user has input a change to the basis for the 45 employees, by increasing the basis to $600,000 and also changed the liability limit to $500,000, $10,000,000, and $500,000. In FIG. 13A, the effective date of the change is input, along with a description of the policy change "change limits; change basis." FIG. 13B illustrates the user inputting the updated basis values and FIG. 13C illustrate the user increasing the employer's liability limit. The change to the basis is done in window mode and the change to the employer's liability is input in slice mode. Thus, the change to the basis, since it is input in window mode, is effective over for the entire duration of the rating period (which in this case is the entire policy term), whereas, a change occurring in slice mode is only effective as of a particular effective or slice date. For example, if the basis change in FIG. 13B (the window mode edit) is effective over the life of the policy, whereas the liability change is only effective as of the effective date (Apr. 30, 2009), a query with a slice date prior to the effective date of the liability change will only return the policy having the updated basis. In the illustrative workers' compensation policy of FIGS. 13A-13C, the policy is effective Mar. 15, 2009 and the liability limit change is effective as of Apr. 30, 2009. If this illustrative policy is queried as of a slice date of Mar. 30, 2009, the policy will be returned having the increased basis without the increased coverages, as shown in FIGS. 14A and 14B. However, viewing the policy as of a slice date of May 30, 2009, the basis increase will be displayed, as will the increased coverages, as illustrated in FIGS. 15A and 15B.

Certain changes, such as the ones previously discussed, will affect the pricing of the policy and, once these changes have been input, a policy change quote may be displayed. As illustrated in FIG. 16, the policy review typically includes a quote rate adjustment. FIG. 16 shows the cost change and breaks out the various changes to illustrate the increases in cost. Further, the previous values are shown along with the new values. By changing the basis for the 45 employees and the liability limit change, the cost of the policy increased by $22,091.00. In order to arrive at the correct total cost, and to charge (or refund) the difference between the current cost and any previous charges, portions of the previous charges are refunded and new charges are made. FIG. 16 shows both the refund transactions and the new charges resulting from the changes.

Figure 17:
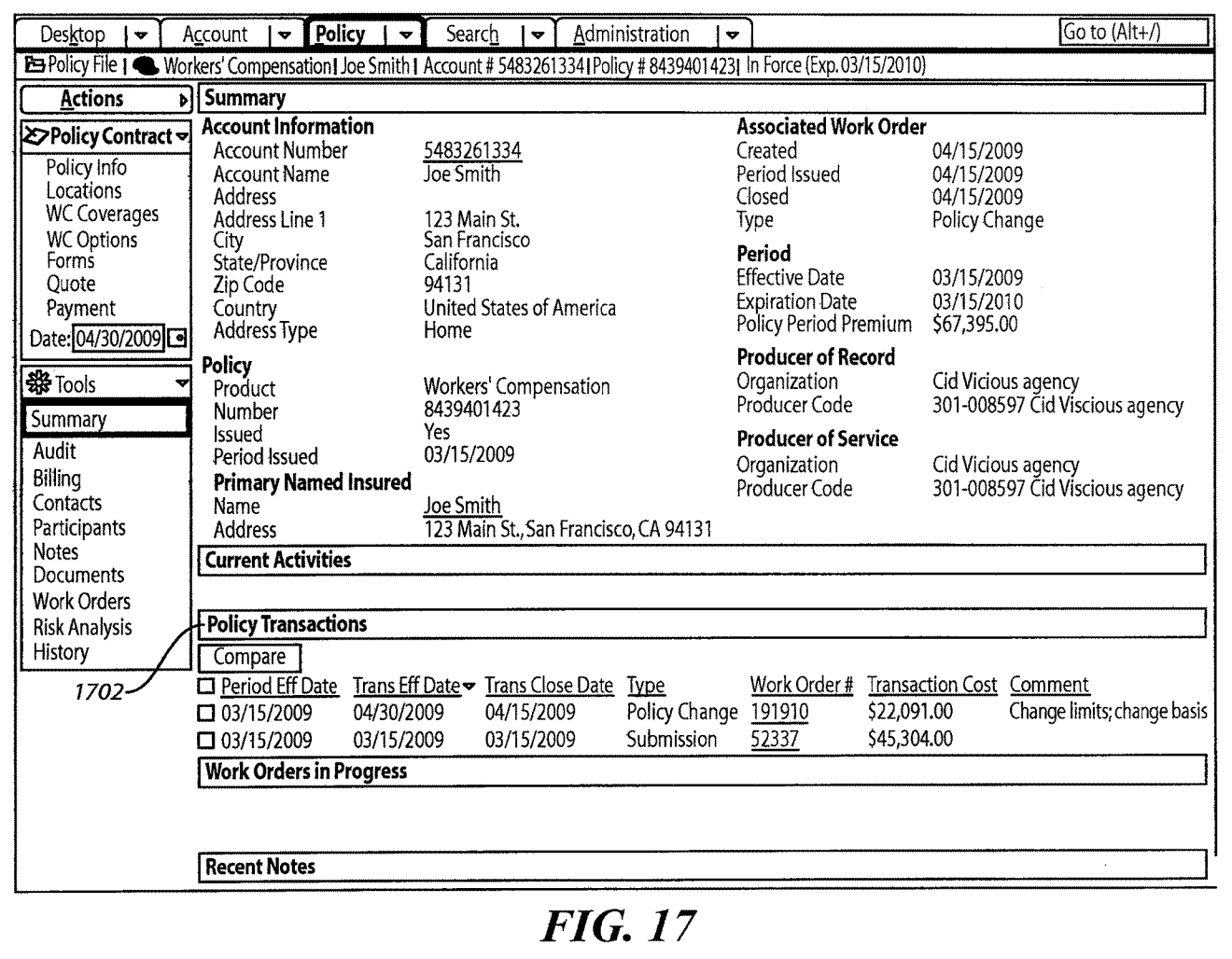

A summary of the policy may also include the adjustment of the transaction cost, as shown in the policy transaction listing 1702 in FIG. 17. The original policy submission cost $45,304.00 and when the policy change occurred the transaction costs increased the policy $22,091.00 and thus, the entire policy premium is $67,395.00. By one approach, the difference in premium can be calculated by the system by comparing the costs associated with the previous version and the costs associated with the newly changed version. By yet another approach, the difference in total cost can be calculated by the system by comparing the costs associated with the newly changed version of the policy to the total sum of all prior financial transactions generated for that period of time by previous versions of the policy.

The pricing of the policy results in the creation of separate cost entities that represent the components of the policy's price, rather than by directly storing price information in the policy elements themselves. The cost entities are stored similarly to the other policy elements, such that each cost entity includes dates on which pricing information is effective and when the pricing information expires. The costs entities are local to a single version of the policy and are copied when a new, editable version of the policy is created. The storage of the cost entities as discrete elements separate from the other policy elements readily facilitates modeling costs that result from multiple cost entities as well as other costs, such as fees and discounts, that don't directly correspond to any regular policy element with an associated cost entity.

Additionally, this discrete storage of cost entities allows the effective and expiration dates of the corresponding pricing to vary differently from the effective and expiration dates of the policy elements being priced. Accordingly, one cost could span the lifetime of several versions of the same policy element. Conversely, the price for one policy element could be split into multiple portions for different periods of time. For example, if a change is made to a vehicle that does not affect pricing that corresponds to the vehicle, the vehicle element will be split into two separate elements, as described above, but the associated cost entities for that vehicle will not be split and will continue to span the original date range.

The process of pricing the policy can, by one approach, proceed as follows. All dates within the policy on which any policy element becomes effective (start effective date) or expired (end effective date) can be found, and then the pricing of the policy can be done for the whole policy at each such date, using the slice mode described previously to create slice portions defined by the start effective date and end effective date. Each slice portion of the policy can be priced as if that price applied for the entire term of the policy. Once pricing of each slice has been completed adjoining slices of time with identical rates can be recombined into a single aggregated cost. Aggregating costs in this way serves both to reduce the number of cost entities that need to be saved to the database and helps to avoid potential rounding errors resulting from the later proration of the cost. Each cost can be prorated based on the actual portion of the policy term that it covers, such that a cost priced at $500 for the whole term will be prorated to $250 if it only spans half the term. Lastly, any costs that always apply for the entire term of the policy, such as taxes, can be calculated based on the subtotal of the previously-calculated costs.

In any event, once the policy's full-term price has been determined, one can calculate the difference between the current price of the policy and the previous price. This is done by determining which set of cost entities, in fact, represent identical policy elements. This determination can be based on a set of uniquely-identifying fields such as the previously-mentioned fixed identifiers. For each set of costs currently on the policy, the matching set of costs from the previous version of the policy is found. In the case of a new submission (or a renewal or rewrite) of the policy there will typically be no previous costs against which to compare. For other types of policy transactions the previous version will be the version that this policy was initially copied from.

Once the sets of new and previous costs have been established, the two sets are then compared. For each range of time in which they differ, an offsetting transaction entity is created. The entity links to the previous cost entity and has an amount equal to that cost's amount prorated for the period of time being offset. An onsetting transaction entity is also created, which links to the new cost entity and has an amount equal to the new cost's amount prorated for the period of time being offset.

Sets of costs that only exist in the previous policy version will result in only offset transactions being generated. Sets of costs that only exist in the new version of the policy (or in situations where there is no previous version) will only generate onset transactions. For those periods of time in which the costs match exactly, no transactions are created. The resulting financial transactions thus contain an amount, a link to a cost, and effective and expiration dates. These financial transactions are not, however, copied whenever a new version of a policy is created; they are a property of one particular policy version rather than part of the legally binding policy as a whole.

As an illustrative example in these regards, FIG. 16. shows the transactions generated from the policy change described above. For example, the basis change for the florists class code resulted in a change of price from $29,628.00 to $44,442.00, which generated an offset transaction of amount −$29,628.00 (exactly cancelling out the original cost) and an onset transaction of amount $44,442.00. Note that offset transactions need not always offset the entire previous cost; a mid-term change to a vehicle coverage that comes exactly in the middle of the policy term that changes the price from $500 to $1000 might generate an offset of −$250 and an onset of $500, for example, as only the price for the second half of the term would have changed.

As mentioned, window mode editing may streamline certain processes due to the efficiencies generated when incorporating policy changes. One such process is policy auditing. For certain insurance policies, such as workers' compensation, the policies are periodically audited to reflect the changing business circumstances. Turning now to screen shot 1800 in FIG. 18, summary section 1801 displays account and policy information. The summary section 1801 indicates that illustrative policy no. 444959 is a workers' compensation policy issued to Wright Construction and Landscaping. Illustrative policy no. 444959 is for the period effective Dec. 4, 2008 until Dec. 4, 2009. In the policy transaction listing 1802, a number of transactions are displayed including submission, changes, renewal, cancellation, and reinstatement. The pricing changes are reflected in the column transaction cost 1814. To review the details of the job, the work order no. from the work order listing 1815 may be selected.

Figure 19:
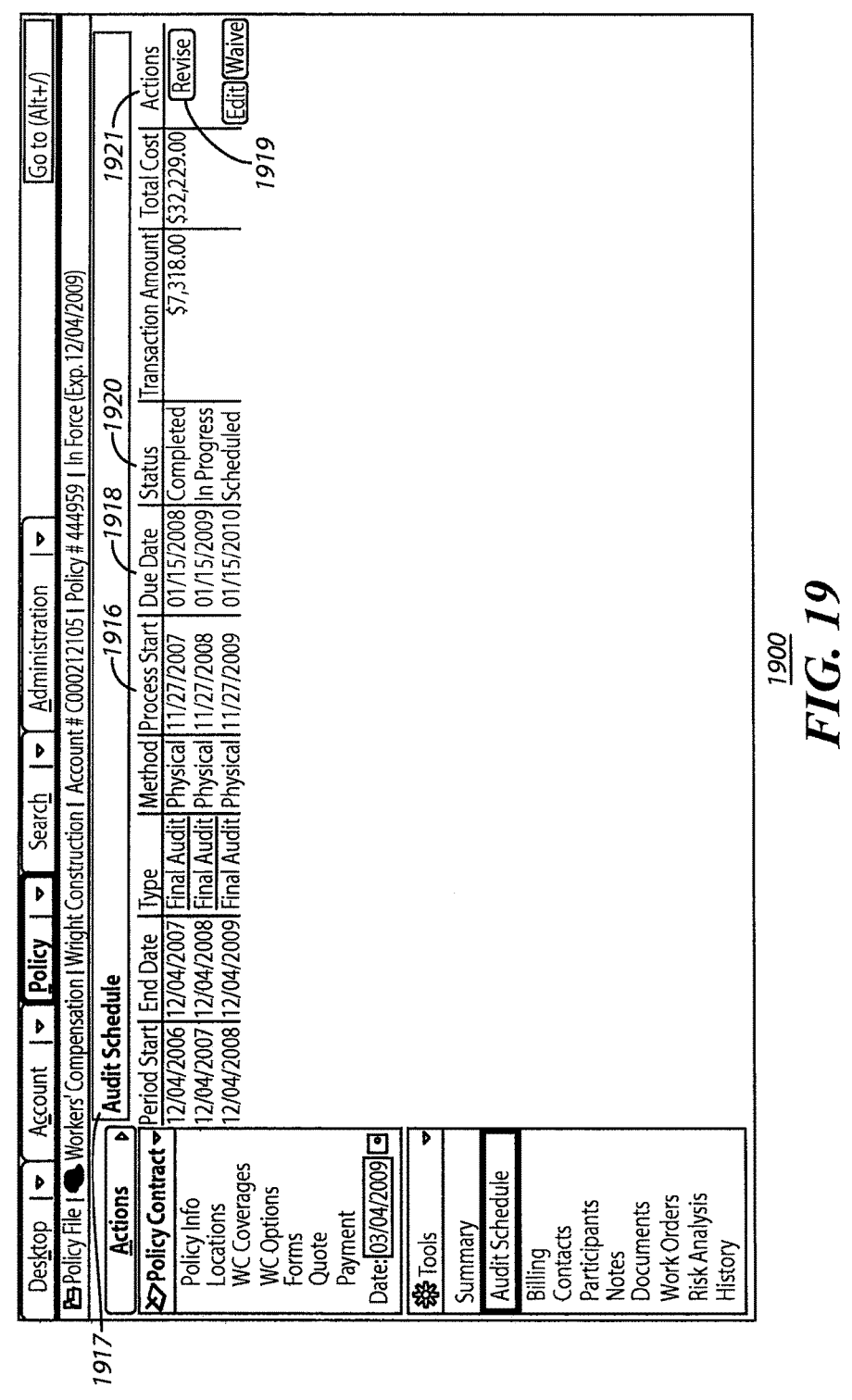

An insurance audit is generally employed when the premium was based on estimated variable rating information, such as payroll or sales. A policy audit permits the user to determine actual premiums for policies billed using estimated values. In an audit, insurance providers are able to input the actual payrolls, sales, or other variable information that is used to calculate the insurance premium so that the actual premium is based on the company's actual results. An audit may be scheduled in the computer system 201 and, for some policies, the audit occurs at the end of the policy term, either expiration or cancellation. By another approach, the audits may occur during the policy term. Additionally, certain policies may require the insured entity to periodically report their actual basis amounts or similar information, and such reports can be treated as audits, though such reports are typically only concerned with a portion of the policy period. In some systems the audits are scheduled automatically when a submission, rewrite, or renewal job occurs. FIG. 19 displays an audit schedule 1917 for illustrative policy no. 444959, which may be reached by navigating to the policy and then selecting the audit option from the tools menu.

Each contractual period includes a "final audit" that is scheduled to begin at the date in the process start listing 1916 and scheduled to finish at the due date listing 1918. Depending on the insurance provider, the audit may begin during the policy or may begin after the expiration of the policy In the audit schedule 1917 shown in screen shot 1900, there are three contractual periods listed for the Write Construction and Landscaping workers' compensation policy. Each of these three contractual periods is at a different stage, as indicated in the status listing 1920: for one of the periods, the audit is listed as "Completed", for the second contractual period, the audit is denoted as "In Progress" and the third contractual period has an audit "Scheduled." Further, for the "Completed" audit, the transaction amount and total cost are listed. The costs are important because the results of the audit determine the actual premium that an insured entity pays.

The information entered into the audit may be gathered in a number of ways, such as having a provider representative visit the company, by telephone, estimation, or in a voluntary manner such as requiring a company to fill out certain forms. After receipt of the information, the user enters the ascertained values into the computer system and the premiums are adjusted based on the actual business activity for the prior contractual period. While previous jobs or transactions input into the computer system were typically bound to become legally-binding, an audit does not alter the legally-effective insurance policy but adjusts the premiums and, therefore, is completed as opposed to bound or saved as legally-binding. In other words, the changes occurring as a result of the audit do not change the legal agreement between the insured and the insurer, so it is desirable to allow the audit to modify the values in the policy without binding a new version of the policy. As described previously, the present invention permits multiple versions of the policy to exist simultaneously and in various states of completion or legal effectiveness. This capability allows for audits to co-exist in the system and to be processed and completed, and to subsequently be retrieved and displayed, without having to replace the currently effective version of the policy.

If an audit is scheduled, but has not yet started, the user can edit the details of how it is scheduled, or waive it. Edit and waive selections are displayed in screen shot 1900. A user may want to edit the audit if changes to the date or method are required to an upcoming edit. If the audit has been finished, it can be revised, such as to edit the input. To revise the audit, the user may select revise 1919 under the actions listing 1921 in audit schedule 1917.

Figure 20:
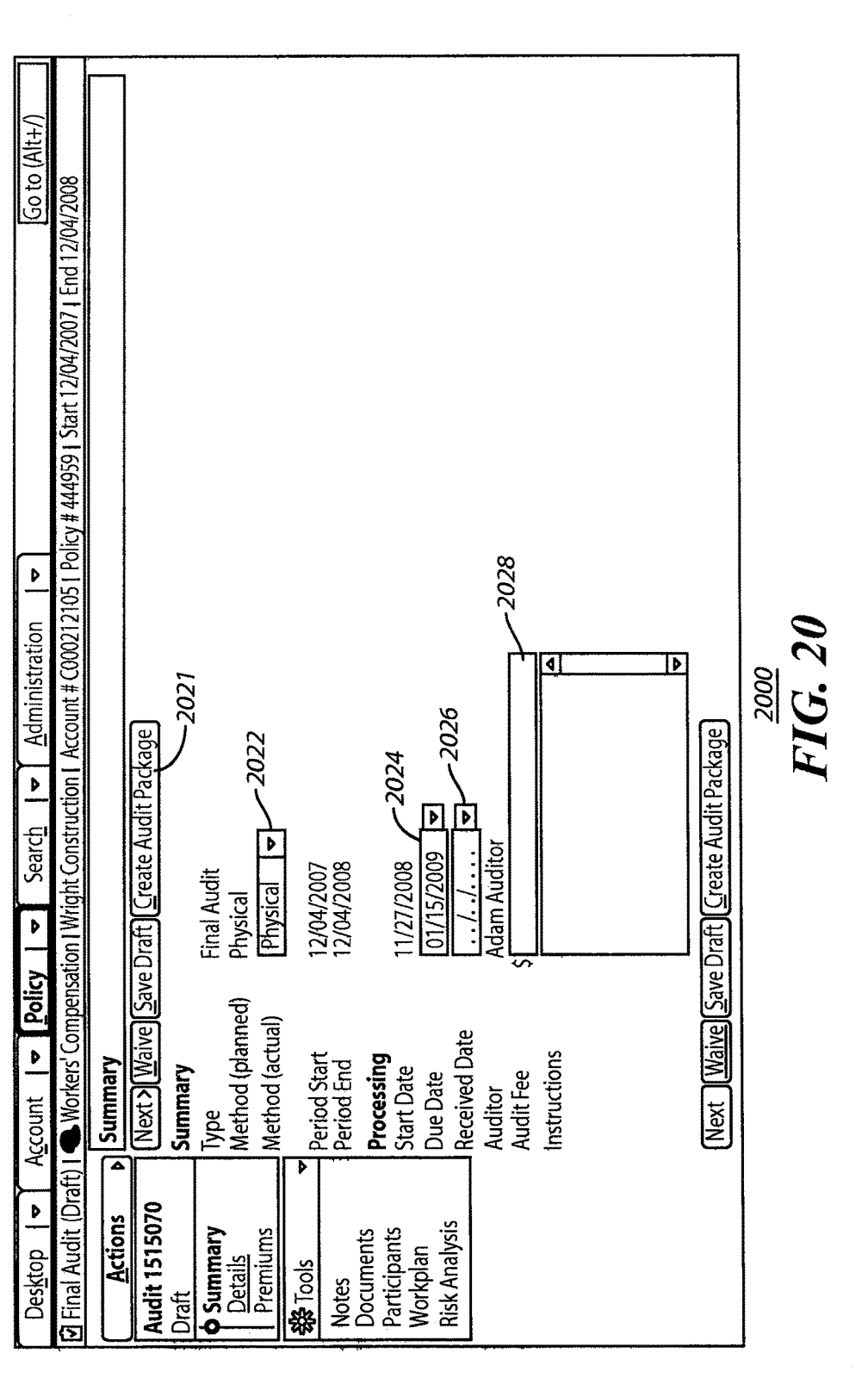

If the audit schedule 1917 indicates that an edit is "In Progress" in the status listing 1920, the user may enter the data acquired during the audit procedure. By selecting the audit that is designated as in progress, an audit summary such as that illustrated in FIG. 20, is displayed. The summary display for example policy no. 444959 indicates the method scheduled and includes a prompt 2022 so that the user may indicate what method was actually used. In the illustrative example of FIG. 20, the physical method was scheduled and is the method actually used to conduct the audit. Further, the summary permits the user to set a due date 2024, a received date 2026, and an audit fee 2028. Once such information has been input, the user advances to screen shot 2100 directed to the details of the policy audit. In addition to moving forward to input the details, the user may select the create audit package tab 2021, which creates a package containing the documents required for doing an audit. This provides the user with an easy method to ensure that all of the required documentation is finalized and executed.

As shown in FIG. 21, the policy details are broken down by locations 2130, 2132, and 2134. In the illustrative example, the locations include California 2130, Texas 2132, and New York 2134. For each location, the user may enter the audited payroll amount for each class code. As can be ascertained from FIG. 21, the estimated payroll for the California 2130, Texas 2132, and New York 2134 was 100,274; however, the audited payroll for California 2130 was found to be 140,000 and for Texas 2132 and New York 2134 was 130,000. Once the details from the audit have been entered, the user may advance to the "Premiums" section, illustrated in screen shots 2200 and 2300 of FIGS. 22 and 23, respectively. Screen shot 2200 illustrates the summary tab 2236 and screen shot 2300 displays the premium details tab 2338. The premium summary tab 2236 includes the audit results with a cost breakdown: total audited premium, taxes and surcharges, total audited cost (including audited premium, taxes, and surcharges), estimated cost, and the difference. In addition, the summary tab 2236 includes a space for comments, such as to annotate or explain the audit results.

Figure 24:
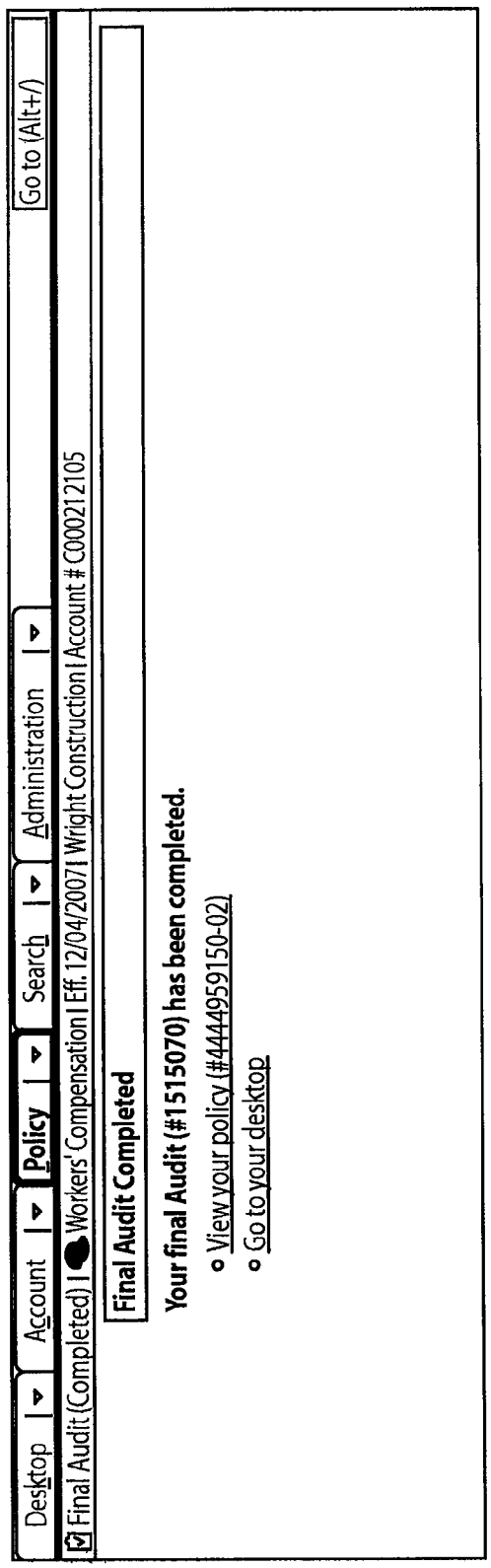
FIG. 24 comprises an illustrative screen shot as configured in accordance with various embodiments of the invention.

Turning now to the premium details tab 2338 of FIG. 23, the results are broken down by location, code, standard premium, and other costs associated with other premiums and surcharges. The partial screen shot 2338 illustrates both New York and California and if the user were to scroll downward from the top of the screen, the premium details for Texas would be found. Since the basis increased for all three locations, the audited premium is larger than the estimated premium and the change between the two is to be paid by the insured entity, Wright Construction and Landscaping. Once the audit has been completed, the user will receive a "Final Audit Completed" indication, such as that found in FIG. 24. Once the final audit has been completed, the Audit Schedule 2517 of FIG. 25, will indicated that the status in listing 1920 is now "Completed," as compared to the "In Progress" listing previous found in FIG. 19.

Once the audit has been "Completed," the audit may only be changed by choosing to revise 2519 in the actions listing 2521. By selecting revise 2519, the user is allowed to enter revised information, similar to the original audit as done in FIGS. 20-23.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, those skilled in the art will recognize and understand that such an apparatus 100 may be comprised of a plurality of physically distinct elements as is suggested by the illustration shown in FIG. 1. It is also possible, however, to view this illustration as comprising a logical view, in which case one or more of these elements can be enabled and realized via a shared platform. It will also be understood that such a shared platform may comprise a wholly or at least partially programmable platform as are known in the art.

I claim:
1. An apparatus, the apparatus comprising:
an end-user interface;
a memory having stored therein an insurance policy comprised of a plurality of policy elements having corresponding effective dates and at least some of the plurality of policy elements having a fixed identifier associated therewith, wherein the fixed identifiers are consistent across various stored versions of an insurance policy such that corresponding policy elements have corresponding fixed identifiers;

a processor operably coupled to the end-user interface and the memory, the processor configured to:

receive one or more revisions to be made to a current version of the insurance policy;

recall, from the memory, a current version of the insurance policy;

copy the current version of the insurance policy into an editable version, wherein the copying of the current version of the insurance policy includes copying, to the editable version, a first policy element in the current version, and wherein the first policy element in the current version and a copy of the first policy element in the editable version share a same fixed identifier;

apply a revision to the copy of the first policy element, wherein the same fixed identifier is retained for the first policy element in the current version and for the revised copy of the first policy element in the editable version, and wherein the editable version comprises an updated version of the insurance policy;

generate a policy price based on the updated version of the insurance policy by summing prorated costs for slices of the updated version, wherein a slice comprises a time slice of the updated version of the insurance policy as of a particular slice time, and wherein the slice is determined based at least in part on the corresponding effective dates of the plurality of policy elements;

compare the policy price based on the updated version with a corresponding stored policy price corresponding to the current version of the insurance policy to determine a difference in the insurance policy premium between the current version and the updated version of the insurance policy;

receive a user request to bind the updated version of the insurance policy as a now-current version of the insurance policy;

store the now-current version of the insurance policy;

store the current version of the insurance policy as a now-previous version of the insurance policy, wherein storing the current version as the now-previous version of the insurance policy includes compressing the now-previous version of the insurance policy at least in part by recording differences between the now-previous version of the insurance policy and the now-current version; and in the event that the now-previous version of the insurance policy is to be retrieved, reconstruct the now-previous version of the insurance policy at least in part by successively applying the recorded differences from the now-current version of the insurance policy.

2. The apparatus of claim 1 wherein generating a policy price comprises creating slices of the insurance policy that are defined by at least one of start effective dates and end effective dates of the policy elements, wherein each such slice has at least one cost corresponding to policy elements of that slice, wherein the costs are prorated according to the effective dates of the slice and then the prorated costs are aggregated to generate the policy price.

3. The apparatus of claim 2 wherein costs having identical rates for adjacent slices are combined to yield a combined cost and then the combined costs are prorated based on a portion of a policy term that the adjacent slices cover.

4. The apparatus of claim 1 wherein determining a difference in the insurance policy premium between the current version and the updated version further includes comparing the policy price based on the updated version with a total sum of all prior financial transactions generated for a time period by previous versions of the insurance policy.

5. The apparatus of claim 1 wherein the processor is further configured to obtain separate cost entities associated with one or more versions of the insurance policy, and wherein the separate cost entities have a start effective date and an end effective date.

6. The apparatus of claim 5 wherein comparing the policy price based on the updated version of the insurance policy with a stored policy price comprises comparing separate cost entities for the updated version with separate cost entities for the current version.

7. The apparatus of claim 6 wherein comparing the policy price based on the updated version of the insurance policy with a stored policy price of the current version of the insurance policy further comprises locating cost entities that correspond to identical policy elements by examining a fixed identifier for each of the cost entities.

8. The apparatus of claim 7 wherein the processor is further configured to produce offsetting and onsetting transactions when the cost entities for the updated version and the current version of the policy differ.

9. The apparatus of claim 8 wherein when the processor determines that a cost entity is present only in the current version of the policy, only offsetting transactions are generated as pertain to that circumstance.

10. The apparatus of claim 8 wherein when a processor determines that a cost entity is only present in the updated version of the policy, only onsetting transactions are generated as pertain to that circumstance.

11. The apparatus of claim 8 wherein for periods of effective time where the cost entities match exactly, no offsetting and no onsetting transactions are generated.

12. The apparatus of claim 5 wherein the start effective date and the end effective date of the separate cost entities may differ from the corresponding effective dates of the plurality of policy elements.

13. The apparatus of claim 5 wherein at least one of the separate cost entities corresponds to a price as applies to an element for the slice.

14. The apparatus of claim 5 wherein at least one of the separate cost entities corresponds to a price as applies to the policy as a whole without being directly related to a particular policy element.

15. The apparatus of claim 14 wherein a price comprises at least one of:
a policy fee; and
a policy discount.

16. The apparatus of claim 5 wherein the separate cost entities that are adjacent to one another in effective time and have identical values are merged into a combined cost entity that spans for a combined effective time.

17. The apparatus of claim 1 wherein the current version of the insurance policy is recalled from the memory in its entirety.

18. The apparatus of claim 1 wherein the now-current version of the insurance policy is stored in its entirety.

19. The apparatus of claim 1 wherein the now-current version of the insurance policy is retrievable without reconstruction.

20. The apparatus of claim 1 wherein the now-current version of the insurance policy is associated with a model number that is immediately subsequent to a model number associated with the now-previous version of the insurance policy, and wherein a given prior version of the insurance policy is stored at least in part by recording differences between the given prior version and an immediately subsequent version by model number.

\* \* \* \* \*